(12) United States Patent
Hamasaki et al.

(10) Patent No.: US 9,514,591 B2
(45) Date of Patent: Dec. 6, 2016

(54) PAPER-SHEET RECOGNITION APPARATUS, PAPER-SHEET PROCESSING APPARATUS, AND PAPER-SHEET RECOGNITION METHOD

(75) Inventors: Hiroki Hamasaki, Hyogo (JP); Tomohiko Kasuya, Hyogo (JP); Akira Bougaki, Hyogo (JP); Norio Morikawa, Hyogo (JP)

(73) Assignee: GLORY LTD., Himeji-Shi (JP)

( * ) Notice: Subject to any disclaimer, the term of this patent is extended or adjusted under 35 U.S.C. 154(b) by 1476 days.

(21) Appl. No.: 12/593,555

(22) PCT Filed: Mar. 29, 2007

(86) PCT No.: PCT/JP2007/056888
§ 371 (c)(1),
(2), (4) Date: Sep. 28, 2009

(87) PCT Pub. No.: WO2008/120357
PCT Pub. Date: Oct. 9, 2008

(65) Prior Publication Data
US 2010/0102234 A1    Apr. 29, 2010

(51) Int. Cl.
*G07F 7/04* (2006.01)
*G06K 7/00* (2006.01)
(Continued)

(52) U.S. Cl.
CPC ............ *G07D 7/121* (2013.01); *H04N 1/484* (2013.01); *G07D 7/20* (2013.01)

(58) Field of Classification Search
CPC ............ H04N 1/02815; H04N 1/193; H04N 1/40056; H04N 1/1013; H04N 1/0287; H04N 1/02865; H04N 1/484; G07D 7/12; G07D 7/121; G07D 7/122; G07D 7/123; G07D 7/124; G07D 7/125; G07D 7/127; G07D 7/0006; G07D 7/0013; G07D 7/002; G07D 7/0026; G07D 7/0033; G07D 7/004; G07D 7/0046; G07D 7/0053; G07D 7/006; G07D 7/0066; G07D 7/0073; G07D 7/008; G07D 7/0086; G07D 7/20; G07D 7/205; G07D 7/2058; G07D 7/2008; G07D 7/2016; G07D 7/202; G07D 7/2025; G07D 7/2033; G07D 7/2041; G07D 7/2066; G07D 11/0078; G07D 2211/00; G07D 2207/00
USPC ......... 194/206, 207; 209/534; 382/135, 232; 358/474–476; 359/196.1; 399/206, 399/220–223; 324/316, 318, 320, 322; 235/379
See application file for complete search history.

(56) References Cited

U.S. PATENT DOCUMENTS 5,914,486 A   6/1999   Yamamoto
5,927,936 A   7/1999   Arikawa et al.
(Continued)

FOREIGN PATENT DOCUMENTS

EP    1 049 055 A2    11/2000
EP    1 437 692 A1    7/2004
(Continued)

*Primary Examiner* — Jeffrey Shapiro
(74) *Attorney, Agent, or Firm* — Foley & Lardner LLP

(57) ABSTRACT

A paper-sheet recognition apparatus that acquires information from a paper sheet and recognizes the paper sheet based on the information. The apparatus includes one or more light emitting units that output first to n-th lights (n≥2) of different wavelengths; an emission controller that performs emission control of the light emitting units; a light receiving unit that receive a component of a light, which has been emitted from the light emitting unit and then reflected from and/or transmitted through the paper sheet; and a paper-sheet recognition processor that recognizes the paper sheet by using an optical signal received by the light receiving unit. The emission controller performs the emission control of the light emitting units such that the number of light emissions per one emission cycle with respect each of to the first to n-th lights differs depending on information desired to be used in recognizing the paper sheet.

18 Claims, 14 Drawing Sheets

(51) Int. Cl.
  *G06K 9/00* (2006.01)
  *G07D 7/00* (2016.01)
  *G07D 7/12* (2016.01)
  *H04N 1/48* (2006.01)
  *G07D 7/20* (2016.01)

(56) References Cited

U.S. PATENT DOCUMENTS

| | | | |
|---|---|---|---|
| 6,084,692 A | | 7/2000 | Ohtani et al. |
| 6,222,623 B1* | | 4/2001 | Wetherell .................. 356/236 |
| 6,354,507 B1 | | 3/2002 | Maeda et al. |
| 6,501,087 B1* | | 12/2002 | Koretsune et al. ........ 250/208.1 |
| 6,797,974 B2* | | 9/2004 | Philipp et al. .............. 250/556 |
| 7,182,197 B2 | | 2/2007 | Nago et al. |
| 7,487,919 B2* | | 2/2009 | Giering et al. ............. 235/491 |
| 7,518,751 B2* | | 4/2009 | Namikata ..................... 358/1.9 |
| 2003/0210386 A1 | | 11/2003 | Laskowski |
| 2004/0164248 A1 | | 8/2004 | Nago et al. |
| 2004/0218802 A1* | | 11/2004 | Suzuki ......................... 382/137 |
| 2005/0053183 A1* | | 3/2005 | Abe et al. ...................... 377/94 |
| 2005/0150738 A1* | | 7/2005 | Hallowell et al. ............ 194/206 |
| 2005/0217969 A1* | | 10/2005 | Coombs et al. .............. 194/206 |
| 2006/0001882 A1* | | 1/2006 | Te Kolste et al. ............ 356/419 |
| 2006/0022059 A1* | | 2/2006 | Juds .............................. 235/494 |
| 2006/0098859 A1* | | 5/2006 | Anouar et al. ................ 382/135 |
| 2007/0076939 A1* | | 4/2007 | Jones et al. .................... 382/135 |
| 2007/0237381 A1* | | 10/2007 | Mennie .................. G06K 9/033<br>382/135 |
| 2007/0286500 A1* | | 12/2007 | Akiyoshi et al. ............. 382/232 |
| 2009/0090660 A1 | | 4/2009 | Matsuura et al. |
| 2009/0153926 A1* | | 6/2009 | Wiltshire et al. ................. 359/2 |
| 2009/0294630 A1* | | 12/2009 | Saito et al. ................. 250/208.1 |

FOREIGN PATENT DOCUMENTS

| | | |
|---|---|---|
| JP | 64-007463 U | 1/1989 |
| JP | 09-212706 A | 8/1997 |
| JP | 9-237365 A | 9/1997 |
| JP | 2001-101473 A | 4/2001 |
| JP | 2002-056428 A | 2/2002 |
| JP | 2003-208650 A | 7/2003 |
| JP | 2004-328159 A | 11/2004 |
| JP | 2005-038389 A | 2/2005 |
| JP | 2006-512668 A | 4/2006 |
| WO | WO 2006/123439 A1 | 11/2006 |

* cited by examiner

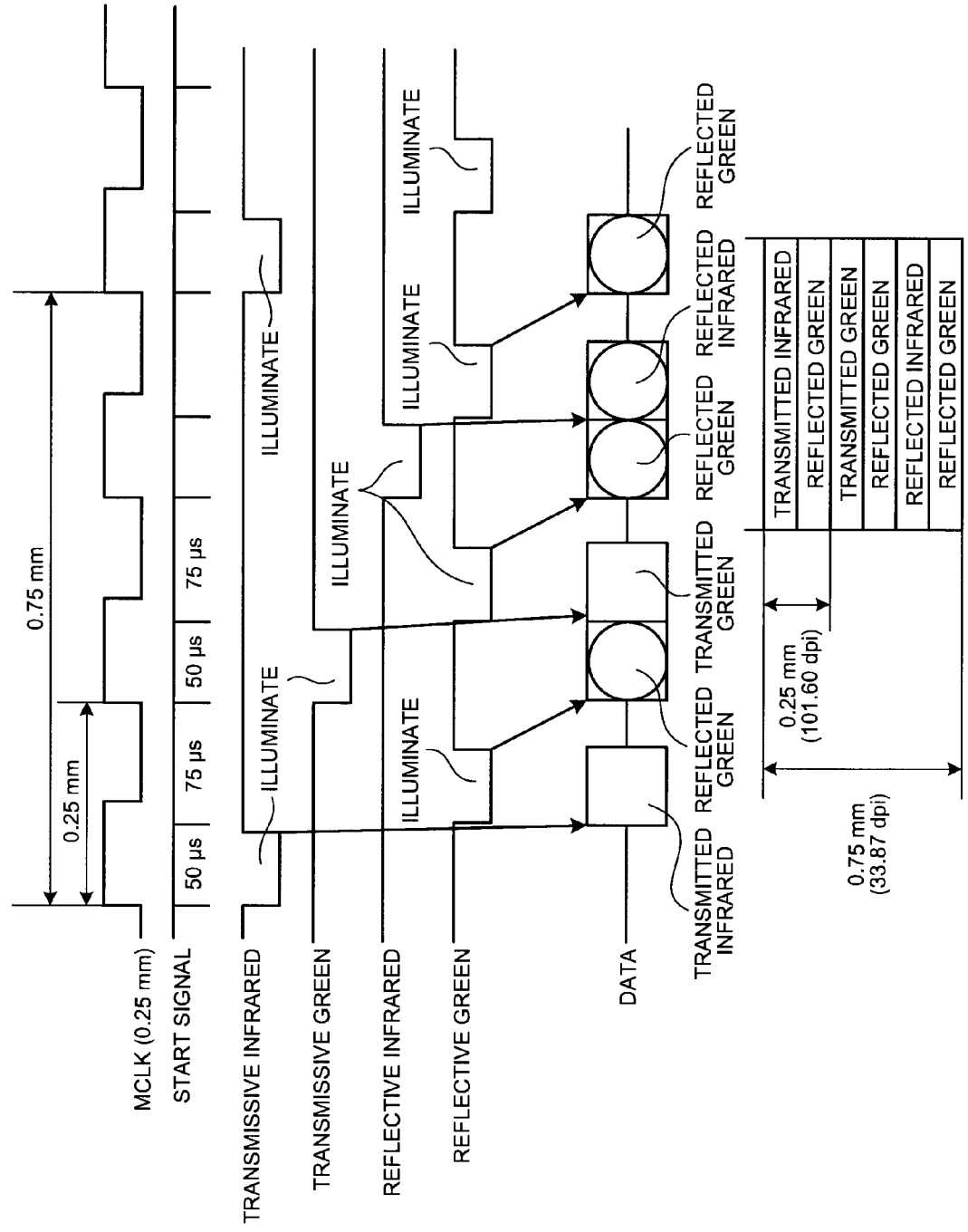

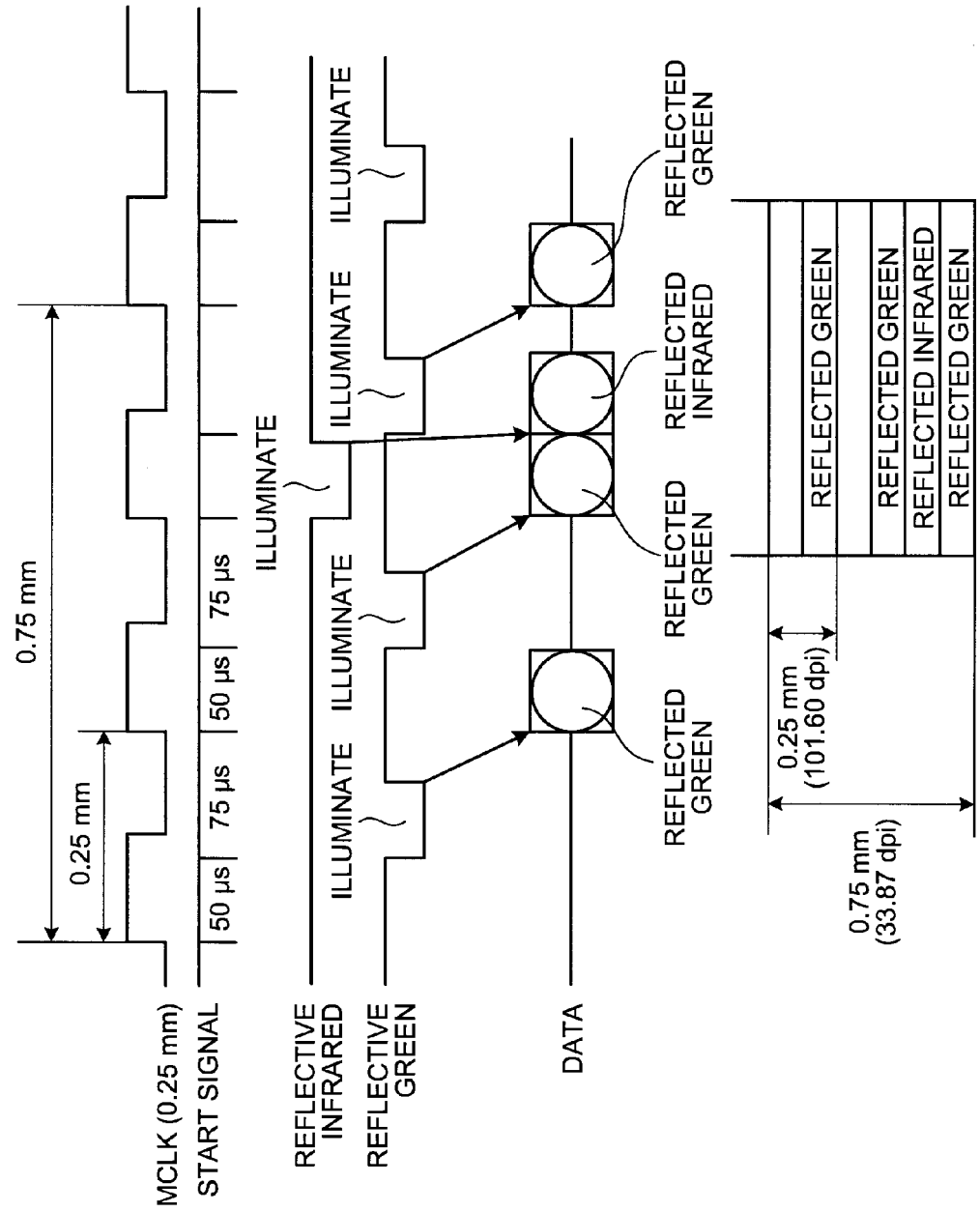

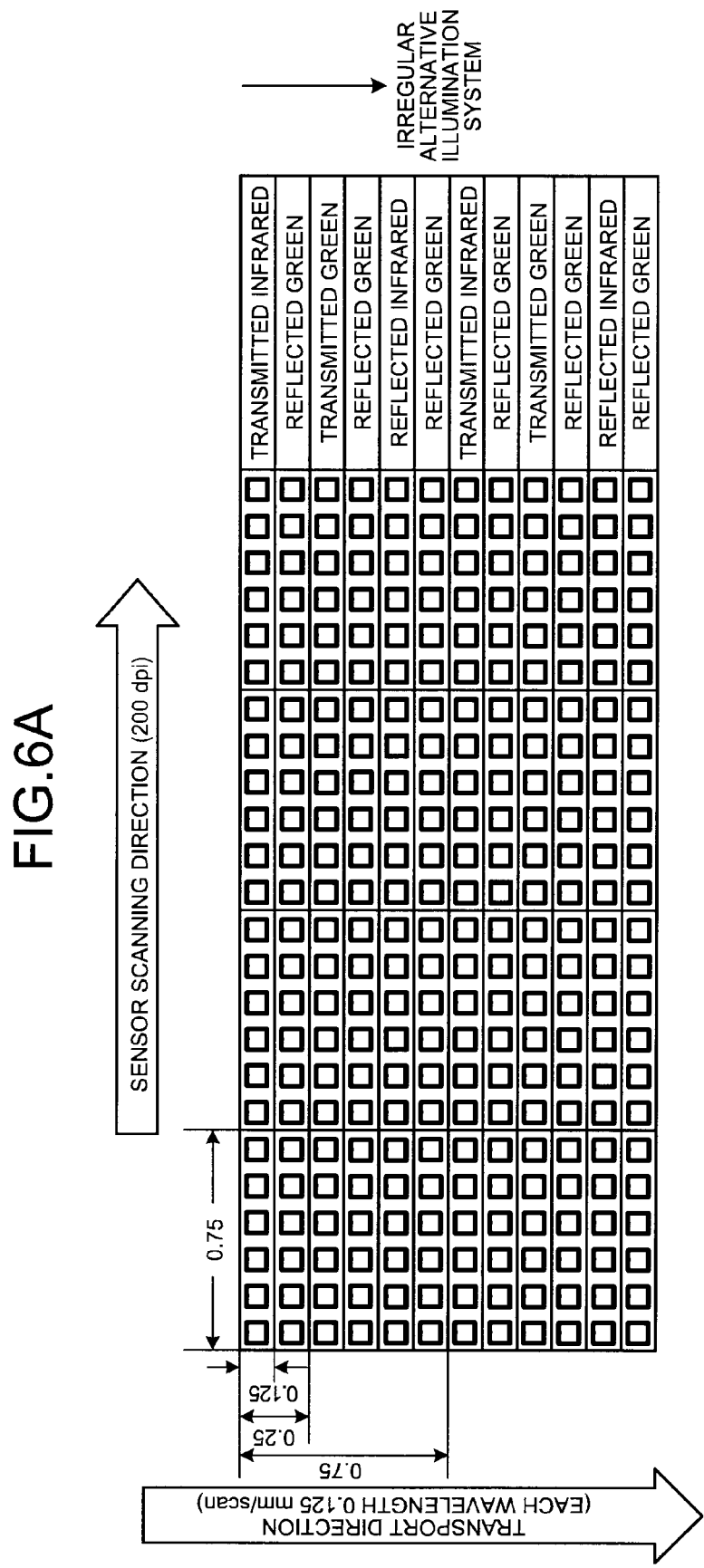

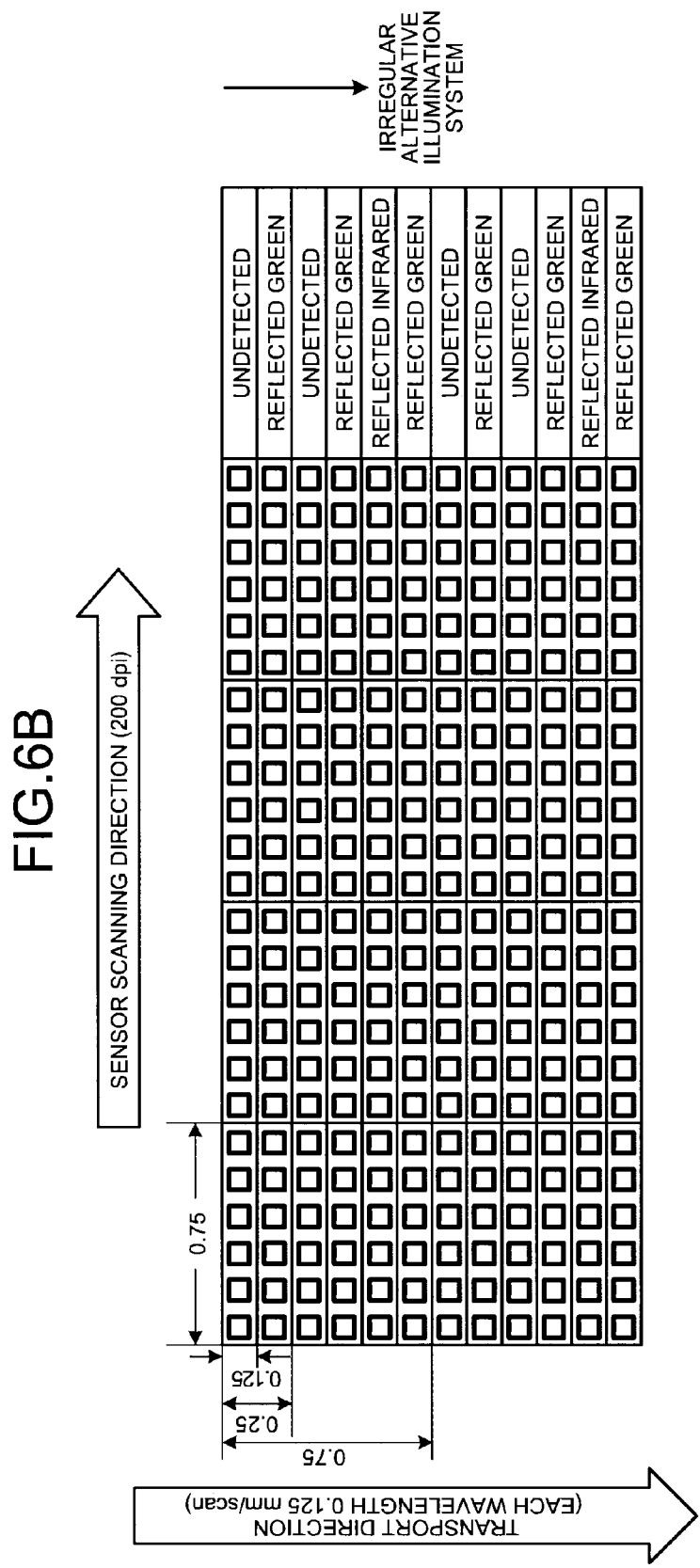

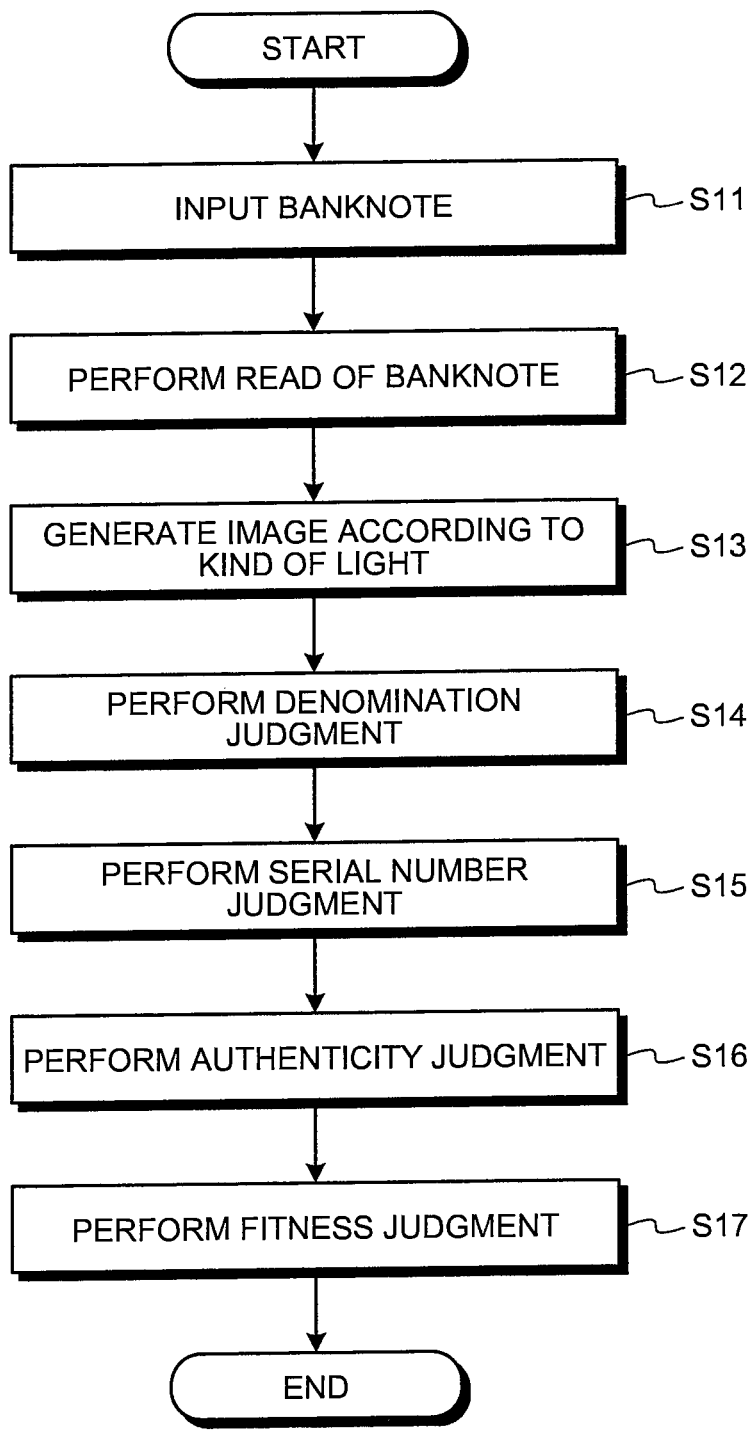

PAPER-SHEET RECOGNITION APPARATUS, PAPER-SHEET PROCESSING APPARATUS, AND PAPER-SHEET RECOGNITION METHOD

TECHNICAL FIELD

The present invention relates to a paper-sheet recognition apparatus and a paper-sheet recognition method for recognizing paper sheets such as banknotes, checks, drafts, and gift certificates. The present invention also relates to a paper-sheet processing apparatus that includes a paper-sheet recognition apparatus.

BACKGROUND ART

An apparatus that handles paper sheets such as banknotes includes a paper-sheet recognition apparatus incorporated therein, which recognizes input banknotes of various denominations and authenticates input banknotes. In the paper-sheet recognition apparatus, it is necessary to read the image of an input paper sheet, and thus the paper-sheet recognition apparatus includes a mechanism therefor. As a conventional mechanism that reads images of paper sheets, there has been proposed a mechanism provided with luminous bodies such as light emitting diodes (LEDs) of a plurality of types that emit lights of different wavelengths, in which the LEDs of a plurality of types that emit light of a different wavelength are simply made to illuminate alternately, to read a reflection image or a transmission image obtained by illuminating by an image sensor (for example, see Patent Documents 1 and 2).

FIG. 1 is an example of line data read by a conventional paper-sheet recognition apparatus. FIG. 1 exemplifies a case that luminous bodies that emit infrared light and green wavelength visible lights are used to acquire a reflection image and a transmission image for each light. As shown in FIG. 1, conventionally, a banknote is read by repeating a cycle of transmitted infrared light→transmitted green→reflected infrared light→reflected green→two areas undetected. Further, conventionally, a banknote is carried by 0.25 mm/scan and is scanned with lights of four different wavelengths (transmitted lights of two wavelengths and reflected lights of two wavelengths), and because there is a state that there is no action for two scans, resolution per wavelength is 16.9 dpi (=1×25.4 mm/(0.25 mm×6)).

Patent Document 1: Japanese Utility Model Application Laid-open No. S64-7463

Patent Document 2: Japanese Patent Application Laid-open No. H9-212706

DISCLOSURE OF INVENTION

Problem to be Solved by the Invention

However, in the image reading mechanism in the conventional paper-sheet recognition apparatus, although a plurality of images with different wavelengths can be acquired, an image suitable for its purpose cannot be always acquired. That is, an image is, simply read by alternately illuminating two kinds of luminous bodies with different wavelengths, and thus, as shown in FIG. 1, only images of the same resolution can be acquired. Recognition of the paper sheets includes a case that an image of low resolution is sufficient and a case that an image of high resolution is required. In this case, there is a problem that the accuracy of recognition of paper sheets, which requires images of high resolution, decreases. Further, various desired images cannot be acquired by freely controlling the wavelength of irradiating light as well as timings, and thus it lacks flexibility.

The present invention has been achieved to solve the problems in the conventional techniques, and an object of the present invention is to provide a paper-sheet recognition apparatus, a paper-sheet processing apparatus, and a paper-sheet recognition method that can acquire images for different purposes in the paper-sheet recognition apparatus and the paper-sheet recognition method in which a plurality of images of a paper sheet are read by irradiating the paper sheet with lights of a plurality of wavelengths to perform identification.

Means for Solving Problem

A paper-sheet recognition apparatus according to an aspect of the present invention acquires information from a paper sheet and recognizes the paper sheet based on the information. The paper-sheet recognition apparatus includes one or more light emitting units that output first to n-th lights (n is an integer equal to or larger than 2) of different wavelengths; an emission controller that performs emission control of the light emitting units; a light receiving unit that receives a component of light, which has been emitted from the light emitting unit and then reflected from and/or transmitted through the paper sheet; a paper-sheet recognition processor that recognizes the paper sheet by using an optical signal received by the light receiving unit. The emission controller performs the emission control of the light emitting units such that a number of light emissions per one emission cycle with respect to each of the first to n-th lights differs depending on information desired to be used in recognizing the paper sheet.

A paper-sheet recognition method according to another aspect of the present invention is for acquiring information from a paper sheet and recognizing the paper sheet based on the information. The paper-sheet recognition method includes a light emitting step of causing one or more light emitting units, which output first to n-th lights (n is an integer equal to or larger than 2) of different wavelengths, to emit the lights by performing emission control of the light emitting units such that a number of light emissions per one emission cycle with respect to each of the first to n-th lights differs depending on information to be used in recognizing the paper sheet; a light receiving step of receiving a component of a light, which has been emitted from the light emitting unit and then reflected from and/or transmitted through the paper sheet; and a paper-sheet-judgment processing step of recognizing the paper sheet by using an optical signal received at the light receiving step.

Effect of the Invention

According to the present invention, because the light emitting units are controlled to emit lights so that the number of light emissions per one emission cycle with respect to each of the first to n-th lights differs depending on information desired to be used in recognizing the paper sheet. Therefore, the resolution of information desired to acquire from the paper sheets can be increased more than those of other pieces of information, thereby enabling to achieve a paper-sheet recognition apparatus and a paper-sheet recognition method that can acquire images for different purposes. Further, it is possible to achieve a paper-sheet recognition apparatus and a paper-sheet recognition method that can perform processing on banknotes with excellent flexibility according to information of paper sheets to be recognized.

BRIEF DESCRIPTION OF DRAWINGS

FIG. 5A is an example of a timing chart for executing the emission control program in FIG. 4.

FIG. 5B is an example of a timing chart for executing the emission control program in FIG. 4.

FIG. 6A is a schematic diagram of a part of line data.

FIG. 6B is a schematic diagram of a part of the line data.

FIG. 7 is a flowchart of an example of a process procedure in a paper-sheet recognition method.

Figure 1:
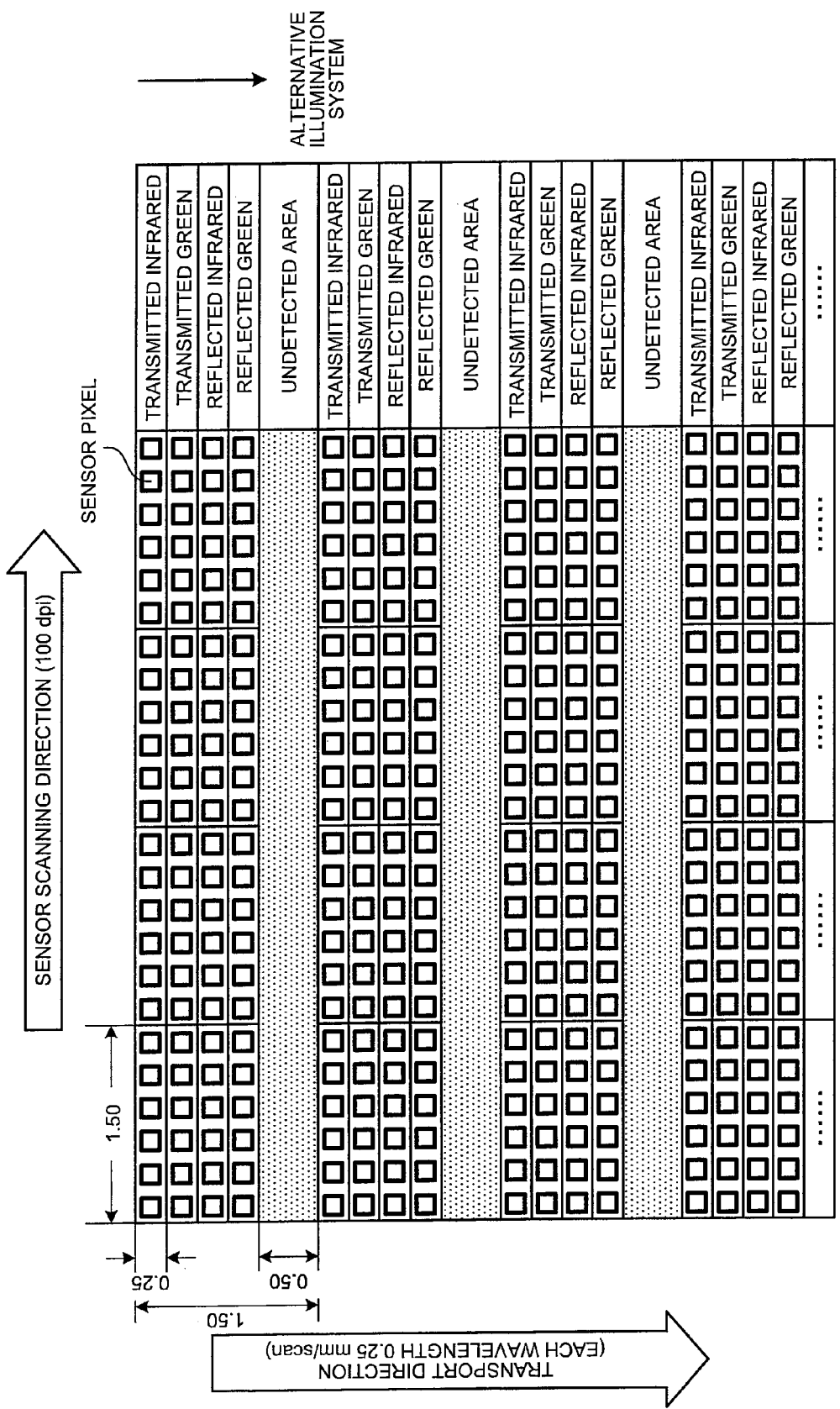
FIG. 1 is an example of line data read by a conventional paper-sheet recognition apparatus.

EXPLANATIONS OF LETTERS OR NUMERALS 10 paper-sheet recognition apparatus
11 banknote recognition sensor
12 banknote transport unit
13 emission-control-program storage unit
14 set emission-control-program memory unit
15 emission controller
16 banknote judgment processor
17 display unit
18 operation unit
19 communication I/F unit
20 control unit
110 first line sensor
111, 122 reflective light source
112, 123 lens
113, 124 light receiving unit
114, 125 A/D converter
115, 126 blocking unit
120 second line sensor
121 transmissive light source
400, 500, 600, 700 paper-sheet processing apparatus
410, 510 banknote receiving unit
411, 511, 611, 711 transport path
412, 512, 612, 712 paper-sheet recognition unit
413a to 413c, 513 stacking unit
414, 514 returning unit
515, 615, 715 banknote recognition sensor
516 control processor
517 display unit
610 inlet
613a to 613f, 713a to 713c by-denomination storing-and-dispensing unit
614 outlet
616, 717 escrow unit
617, 714 reject box
710 handling port
715 banknote recognition sensor
716 feeding unit
718 temporary stacking unit

BEST MODE(S) FOR CARRYING OUT THE INVENTION

Exemplary embodiments of a paper-sheet recognition apparatus, a paper-sheet processing apparatus, and a paper-sheet recognition method according to the present invention will be explained below in detail with reference to the accompanying drawings. In the following embodiments, a case of applying the present invention to identification of banknotes is described. However, the present invention is not limited to these embodiments, and is applicable to general paper sheets, such as checks, drafts, and gift certificates.

First Embodiment

Figure 2:
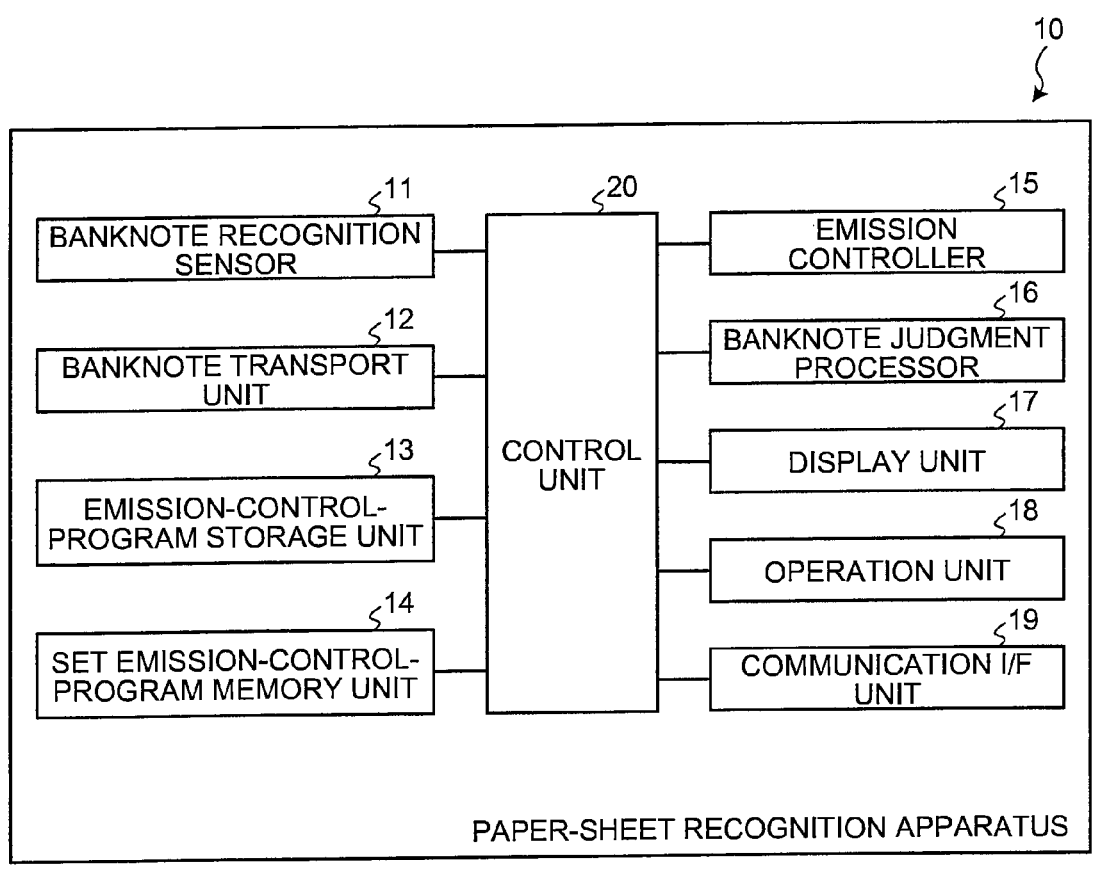
FIG. 2 is a schematic block diagram of a functional configuration of a paper-sheet recognition apparatus according to a first embodiment of the present invention.

FIG. 2 is a schematic block diagram of a functional configuration of a paper-sheet recognition apparatus according to a first embodiment of the present invention. A paper-sheet recognition apparatus 10 includes a banknote recognition sensor 11, a banknote transport unit 12, an emission-control-program storage unit 13, a set emission-control-program memory unit 14, an emission controller 15, a banknote judgment processor 16, a display unit 17, an operation unit 18, a communication interface (hereinafter, "I/F") unit 19, and a control unit 20.

The banknote recognition sensor 11 reads information of a banknote input by using various means to confirm denomination, authenticity, fitness, and serial number of the banknote input to the paper-sheet recognition apparatus 10. In the first embodiment, a case that the banknote is optically read to perform judgment is described. Therefore, illustrations and explanations of units other than an optical reader will be omitted. Further, in the first embodiment explained below, a line sensor is explained as an example of a banknote recognition sensor. However, the banknote recognition sensor is not limited to the line sensor, and the present invention is similarly applicable to a case of using a one-dimensional sensor.

Figure 3:
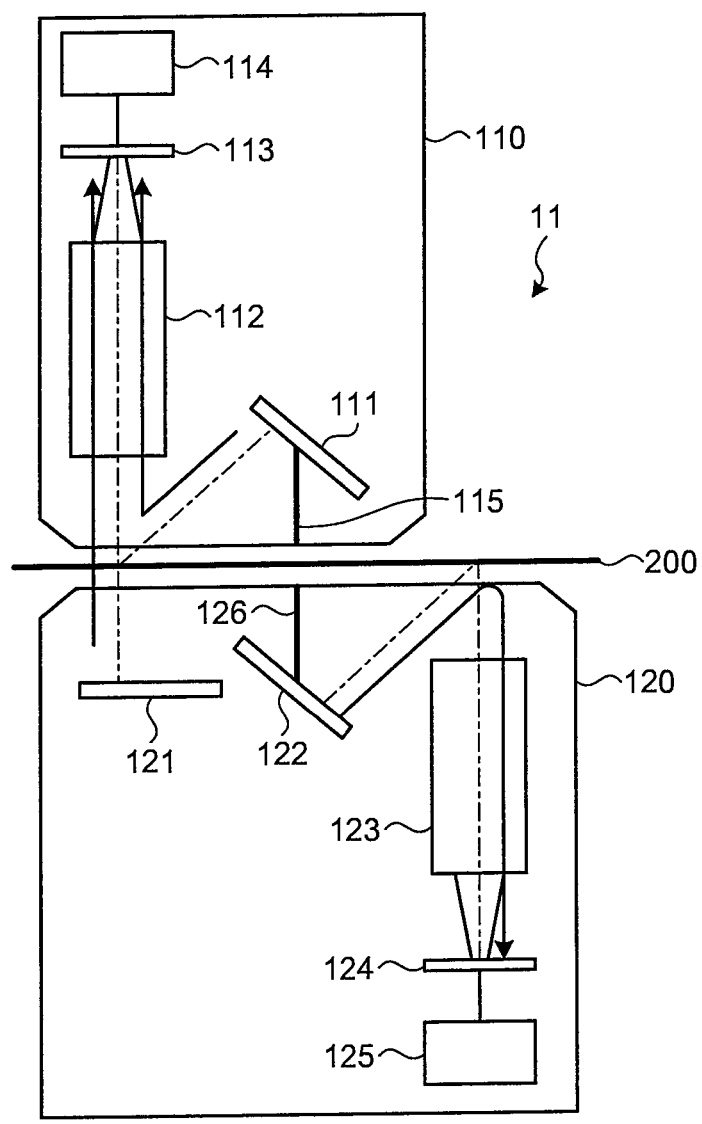
FIG. 3 is a schematic diagram of a configuration of banknote recognition sensors.

FIG. 3 is a schematic diagram of an example of a configuration of the banknote recognition sensor. As shown in FIG. 3, the banknote recognition sensor 11 includes a first line sensor 110 that reads an image on one surface of an input banknote 200 with any wavelength within a wavelength range of the infrared light, visible light, and ultraviolet light, and a second line sensor 120 that reads an image on the other surface of the input banknote with any wavelength within a wavelength range of the infrared light, visible light, and ultraviolet light.

The first line sensor 110 includes: a reflective light source 111 that irradiates one surface of the banknote 200 with light of a predetermined wavelength (light of one or more wavelengths selected from the wavelength range of infrared light, visible light, and ultraviolet light); a lens 112 that collects lights emitted from the reflective light source 111 and reflected from the banknote 200 or lights emitted from a transmissive light source 121 of the second line sensor 120 described later and transmitted through the banknote 200; a light receiving unit 113 that converts the lights collected by the lens 112 to electric signals, an A/D converter 114 that converts the electric signal converted by the light receiving unit 113 to a signal having a predetermined size, and a blocking unit 115 that blocks the light from a reflective light source 122 in the second line sensor 120 during read by the light receiving unit 113.

The second line sensor 120 includes the transmissive light source 121 that emits light of a predetermined wavelength from the other surface of the banknote 200, the reflective light source 122 that irradiates the other surface of the banknote 200 with light of a predetermined wavelength, a lens 123 that collects lights reflected from the banknote 200, a light receiving unit 124 that converts the lights collected by the lens 123 to electric signals, an A/D converter 125 that converts the electric signal converted by the light receiving unit 124 to a signal having a predetermined amplitude, and a blocking unit 126 that blocks the light from the reflective light source 111 in the first line sensor 110 during read by the light receiving unit 124. Because a part of the light emitted from the transmissive light source 121 in the second line sensor 120 is detected by the light receiving unit 113 via the lens 112 in the first line sensor 110, the transmissive light source 121 is arranged on an optical axis of the lens 112 in the first line sensor 110.

In the first and second line sensors 110 and 120, the reflective light sources 111 and 122 include a plurality of light-emitting elements capable of emitting lights of different wavelengths as a whole, such as LEDs, each of which emits light of a predetermined wavelength, or light-emitting elements such as LEDs, each of which can emit lights of a plurality of different wavelengths. For example, an LED array in which the LEDs are aligned is used for the first and second line sensors 110 and 120. Any one of the visible light, infrared light, and ultraviolet light or a combination thereof is used as the light required for reading the banknote 200. Therefore, as the LED, one that emits light in a wavelength range of the visible light, one that emits light in a wavelength range of the infrared light, and one that emits light in a wavelength range of the ultraviolet light are provided according to a type of information to be acquired. It is desirable to include the LEDs that emit lights of the wavelengths respectively corresponding to three primary colors of light, that is, red, green, and blue, so that the wavelength of a visible light beam can be changed arbitrarily according to a kind of banknote 200 to be read. However, an LED that only emits light of a particular color (wavelength) according to the kind of banknote to be used (for example, a light source of green, yellow, or yellowish green) may be equipped in the light source. In the first embodiment, a case is explained, as an example, in which a light source for the visible light beams including red, green, and blue LEDs that can emit light of an arbitrary wavelength of the visible light, and a light source for infrared light including an LED that emits infrared light are included as the reflective light sources 111 and 122. The same applies to the transmissive light source 121 in the second line sensor 120. Invisible light beams in the claims are lights other than the visible light beams, and includes the infrared light and ultraviolet light. In the present specification, the visible light means light in a wavelength range between the infrared light and the ultraviolet light, and the visible light beam means light (a light beam) of a predetermined wavelength in the visible light range emitted to a test object (paper sheet) to examine the test object for a predetermined purpose.

The emission-control program storage unit 13 stores an emission control program in which the light timing related to a color (wavelength) to be emitted from the reflective light source 111 in the first line sensor 110, and the transmissive light source 121 and the reflective light source 122 in the second line sensor 120 are set. In the emission-control-program storage unit 13, a plurality of emission control programs created beforehand for each type and denomination of the banknote or for each country or region are stored, according to information of banknotes to be recognized, such as feature information of the banknotes, judgment information of fitness of the banknotes, or judgment information of denomination of the banknotes. In the present specification, the type of banknote of the banknotes differs by each country or region, and the denomination means a kind of banknote in one country or region (for example, variety, such as 10,000 yen bill, 5,000 yen bill, 2,000 yen bill, and 1,000 yen bill in Japan). The type and denomination of the banknote are collectively referred to as the kind of banknote.

The set emission-control-program memory unit 14 stores an emission control program actually to be executed, of a plurality of emission control programs stored in the emission-control-program storage unit 13. The emission-control-program storage unit 13 and the set emission-control-program memory unit 14 can be integrated into one.

The emission controller 15 controls illumination of the reflective light source 111 in the first line sensor 110, and the transmissive light source 121 and the reflective light source 122 in the second line sensor 120, based on the emission control program stored in the set emission-control-program memory unit 14.

The banknote judgment processor 16 performs judgment of denomination, authenticity, and fitness of the banknote, based on banknote read information including a reflection image and transmission image read by the banknote recognition sensor 11, according to an installation site and a purpose of the paper-sheet recognition apparatus 10. The banknote judgment processor 16 holds banknote judgment information for judging the denomination, authenticity, and fitness for each type (such as Japanese Yen, US dollar, and Euro) of the banknote to be read, and compares the banknote judgment information with the banknote read information including the reflection image and transmission image of the banknote read by the banknote recognition sensor 11, to judge the denomination, authenticity, and fitness.

The display unit 17 has a function of displaying a setup screen when setting the emission control program based on a display program, and includes a display device such as a liquid crystal display. At normal time, the display unit 17 displays various pieces of information such as operation information, processing information including the number of banknotes processed and a total amount, and status of the apparatus to an operator of the paper-sheet recognition apparatus 10.

The operation unit 18 sets the emission control program with respect to the paper-sheet recognition apparatus 10, and includes a button and a cursor. Specifically, when an emission control program is selected by an administrator or installation personnel of the paper-sheet recognition apparatus 10 from the emission control programs in the emission-control-program storage unit 13 based on the setup screen of the emission control program displayed on the display unit 17, the operation unit 18 stores the selected emission control program in the set emission-control-program memory unit 14. At the time of selecting the emission control program, the setup screen may be configured so that when a country, denomination, and recognition item for recognizing the banknote are selected, an emission control program corresponding to the selection is selected. At normal time, the operation unit 18 is used to perform processing of the paper-sheet recognition apparatus 10 and processing for controlling an operation (selection of various modes such as processing start, counting, and fitness sorting of banknotes).

The communication I/F unit 19 is an interface for connecting the paper-sheet recognition apparatus 10 town information processing terminal such as a personal computer. It is used when the paper-sheet recognition apparatus 10 is connected to the information processing terminal to store the emission control program created by the information processing terminal in the emission-control-program storage unit 13. The control unit 20 controls respective processing units. Further, the control unit 20 can have a function of performing processing corresponding to a content selected at the time of selecting the country, denomination, and recognition item.

In the first embodiment, the emission control program for controlling illumination of a plurality of luminous bodies anomalistically according to a purpose can be arbitrarily created and set. The emission control program is explained here. A kind of light to be used and an item that can be judged are explained first, then an example when the number of light emissions per one emission cycle is changed depending on a judgment purpose of the banknote and an actual, example of the emission control program will be explained.

A reflected visible light beam is suitable for judgment of denomination, and capable of confirming the serial number and judging scribbles of the fitness. However, the reflected visible light beam is not suitable for judgment of authenticity and judgment of soils or wrinkles as to the fitness. A transmissive visible light beam can judge authenticity of the banknote whether it is a counterfeit note, and judge the fitness whether it has an abnormal thickness by detecting a difference in thickness based on a change in a light quantity. However, the transmissive visible light beam is not suitable for judgment of denomination and serial number.

The reflective infrared light is suitable for judging authenticity of the banknote because the light indicate the feature information corresponding to the kind of banknote. It can be also used for judgment of denomination, fitness, and serial number. The transmissive infrared light is particularly suitable for judging authenticity of the banknote, and it can be also used for judgment of fitness of the banknote due to soil or the like. However, the transmissive infrared light is not suitable for judging the denomination and serial number.

A reflective ultraviolet light and a transmissive ultraviolet light are suitable for judging authenticity of the banknote for acquiring the feature information corresponding to the kind of banknote, like the infrared light.

A case in which judgment is performed by using each light alone has been described above. However, the fitness can be judged by a light quantity ratio of the reflected visible light beam and reflected infrared light, and judgment can be performed by combining measurement results obtained by using the lights described above.

Note that the feature of the visible light beam described above is a feature acquired by collectively coordinating features in the case that lights each having a specific wavelength of the visible light are used, not a feature in the case that light (white light) including wavelengths of the entire visible light is emitted. The visible light changes from red to purple depending on the wavelength, and it is determined which wavelength is to be used according to a color of the banknote to be recognized. However, the same function can be provided by using white light and an optical filter.

For example, a reflective green light beam can be generally used commonly to banknotes of different countries. Further, a reflective red light beam is suitable to banknotes such as US dollar bills on which green is printed, and a reflective yellow light beam is not suitable to dark and light banknotes such as the 200 Euro bill, whose color is white and beige.

As described above, the transmissive visible light beam detects a change in the light quantity, and abnormality in thickness of the banknote. As the abnormality in thickness of the banknote, for example, there can be mentioned a case of counterfeit note and that a plurality of banknotes are overlapped.

The reflected infrared light can detect the feature regardless of the soil on the banknote. For example, when an infrared-absorbing ink is applied to the banknote, authenticity judgment can be performed using the infrared-absorbing ink. Further, the transmitted infrared light can be used for performing authenticity judgment using a watermark embedded in the banknote.

The reflective ultraviolet light and the transmissive ultraviolet light detects a fluorescent material embedded in the banknote for security purposes, thereby performing authenticity judgment.

As described above, it is different as to which judgment of denomination, authenticity, fitness, and serial number is suitable according to the kind of light to be used. For example, when it is desired to judge the denomination mainly, or when it is desired to confirm the serial number, an emission control program for reading a banknote whose image scanned by the reflective visible light beam has high resolution is prepared. To acquire a reflection image having high resolution, an emission control program is prepared, which is written such that the proportion of scans using the reflective visible light beams is larger as compared to scans using other lights. Green light can be widely used generally as the visible light beam; however, red light can be used according to circumstances, such as a color of the ink used in the banknote. A plurality of emission control programs prepared according to which judgment of denomination, authenticity, fitness, and serial number is mainly performed are stored beforehand in the emission-control-program storage unit 13, and an emission control program for mainly performing processing desired to be executed mainly is selected from the emission control programs via the operation-unit 18.

There are banknotes in which a printed color is different from a color of the serial number. Therefore, the emission control program may be prepared, which is created such that wavelengths of light to be emitted from the light-emitting element and the number of light emissions per one emission cycle thereof differ depending on combination of the printed color of the banknote and the color of the serial number.

Further, when the paper-sheet recognition apparatus 10 is used at a place where there are many soiled note, an emission control program may be prepared, which is created such that the number of light emissions per one emission cycle with respect to the reflective infrared light and transmissive infrared light, which are hardly affected by the soil, is increased.

When it is desired to mainly judge the authenticity, the emission control program for reading a banknote whose image scanned by the reflective infrared light, transmissive infrared light, reflective ultraviolet light, and transmissive ultraviolet light has high resolution is prepared.

The emission control programs prepared according to the information desired to be acquired are collectively stored in the emission-control-program storage unit 13. In this case, the respective emission control programs can be stored in association with the country or region, and denomination. Further, in addition to or as an alternative to the association with the country or region, the emission control programs can be stored in association with an intended use and information desired to be acquired. Thus, by storing the emission control programs in association with the country or region, intended use, and information desired to be acquired, an emission control program corresponding to the country or region where the paper-sheet recognition apparatus 10 is used, and an emission control program corresponding to the intended use or information desired to be acquired can be extracted from the plurality of emission control programs, and a setting operation thereof to the set emission-control-program memory unit 14 by the operation unit 18 can be facilitated.

Figure 4:
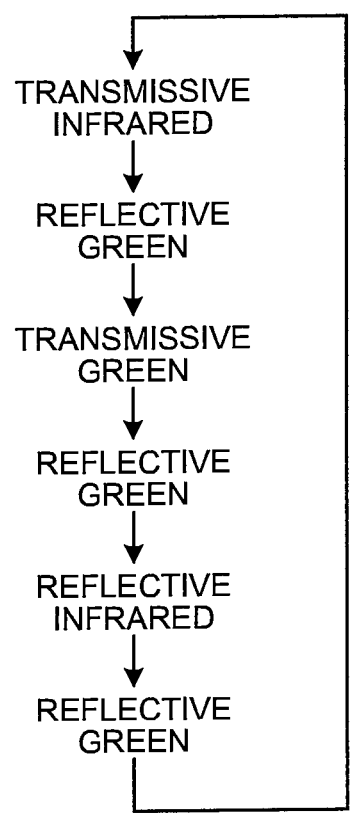
FIG. 4 is an example of an emission control program.

FIG. 4 is an example of a control image by the emission control program. The emission control program is used by the paper-sheet recognition apparatus 10 that mainly recognizes the denomination and serial number. Therefore, the emission control program causes the reflective light source 111 in the first line sensor 110, and the transmissive light source 121 and the reflective light source 122 in the second line sensor 120 to light up irregularly in an order of transmissive infrared→reflective green→transmissive green→reflective green→reflective infrared→reflective green. That is, the resolution with respect to the reflected green is increased by causing the reflected green to light up three times in one cycle. Accordingly, recognition of the denomination or serial number can be performed more accurately.

FIG. 5A is an example of a timing chart of emission control of the reflective light source in the first line sensor and the transmissive light source in the second line sensor for executing the emission control. FIG. 5B is an example of a timing chart of emission control of the reflective light source in the second line sensor for executing the emission control in FIG. 4. FIG. 5A depicts a timing chart in which illumination of the reflective light source 111 in the first line sensor 110 and the transmissive light source 121 in the second line sensor 120 is controlled by a four-wavelength variable speed alternating lighting system of the reflective infrared light, transmissive infrared light, reflective green light, and transmissive green light when read cycle is 50 microseconds and transport speed is 2,000 mm/s. FIG. 5B depicts a timing chart in which illumination of the reflective light source 122 in the second line sensor 120 is controlled by a two-wavelength variable speed alternating lighting system of the reflective infrared light and the reflective green light when read cycle is 50 microseconds and transport speed is 2,000 mm/s. As shown in FIGS. 5A and 5B, emission of the reflective light source 111 in the first line sensor 110, and the transmissive light source 121 and the reflective light source 122 in the second line sensor 120 is controlled, and the reflective light or transmissive light corresponding to each light (wavelength) is detected by the light receiving units 113 and 124, thereby enabling to acquire data. The light sources for the transmissive infrared light, transmissive green, and reflective infrared light, which are used when an image can have low resolution, are illuminated at a leading edge of a clock signal (MCLK), and the light source for the reflective green, which is used when an high resolution image is required, is illuminated at a starting part of a start signal of 75 microseconds in the start signal.

FIG. 6A is a schematic diagram of a part of line data on a first surface (a surface on the first line sensor side) acquired as a result of scanning based on the emission control in FIG. 4. FIG. 6B is a schematic diagram of a part of line data on a second surface (a surface on the second line sensor side) acquired as a result of scanning based on the emission control in FIG. 4. It is assumed that the banknote is transported at a speed of 0.125 mm/scan for each wavelength.

In the line data on the first surface side in FIG. 6A, the uppermost first line represents line data acquired by receiving the infrared light emitted from the transmissive light source 121 in the second line sensor 120 and transmitted through the banknote 200 by the light receiving unit 113 in the first line sensor 110. The second, fourth, and sixth lines represent line data acquired by receiving the green light emitted from the reflective light source 111 in the first line sensor 110 and reflected by the banknote 200 by the light receiving unit 113 in the first line sensor 110. The third line represents line data acquired by receiving the green light emitted from the transmissive light source 121 in the second line sensor 120 and transmitted through the banknote 200 by the light receiving unit 113 in the first line sensor 110. The fifth line represents line data acquired by receiving the infrared light emitted from the reflective light source 111 in the first line sensor 110 and reflected by the banknote 200 by the light receiving unit 113 in the first line sensor 110. The seventh line and thereafter are repetitions of the first to sixth lines.

The line data on the second surface side in FIG. 6B is same as data in FIG. 6A; however, because the light source for detecting the transmissive light above the second surface side is not provided in the first line sensor 110, the first and third lines corresponding to this part are undetected.

The resolution in the cases shown in FIGS. 6A and 6B is 203.2 dpi (=25.4 mm×6/0.75 mm), and the resolutions of the transmissive infrared light, transmissive green, and reflective infrared light is 203.2 dpi×1/6=33.9 dpi. The resolution of the reflective green is 203.2 dpi×3/6=101.6 dpi. Accordingly, an image having a resolution for the reflective green three times higher than those of other wavelengths can be acquired.

An operation of the paper-sheet recognition apparatus 10 is explained next. FIG. 7 is a flowchart of an example of a process procedure in a paper-sheet recognition method. When a banknote is input to the paper-sheet recognition apparatus 10 (step S11), the banknote is transported through a path, where the first and second line sensors 110 and 120 are installed, at a predetermined speed by the banknote transport unit 12. The banknote recognition sensor 11 reads the transported banknote (step S12). At this time, the emission controller 15 controls the emission timing of the reflective light sources 111 and 122 and the transmissive light source 121 in the banknote recognition sensor 11, based on the emission control program stored in the set emissioncontrol-program memory unit 14. The control of the emission timing of the reflective light sources 111 and 122 and the transmissive light source 121 is performed at the timing as shown in FIGS. 5A and 5B. The signals received by the light receiving units 113 and 124 are A/D converted and output to the banknote judgment processor 16.

Then, an image corresponding to the kind of light detected by the light receiving unit (reflection image and/or transmission image) is generated (step S13). Thereafter, the banknote judgment processor 16 performs denomination judgment of the banknote based on the acquired image (step S14). Orientation of the banknote is also judged. The banknote judgment processor 16 judges denomination of the banknote based on banknote judgment information (not shown).

The banknote judgment processor 16 cuts out the serial number from the image, and performs serial-number judgment processing for comparing the cut serial number with serial numbers of counterfeit notes in the banknote judgment information (step S15). A reflection image acquired at the time of generally emitting the visible light beam is used for the serial-number judgment processing. In this manner, the processing in the paper-sheet recognition method is complete.

In the flowchart described above, the serial-number judgment processing is exemplified and explained. However, the same applies to authenticity judgment and fitness judgment, in which an image suitable for each judgment can be acquired according to the present invention to perform judgment by using the image.

The emission control program executed by the paper-sheet recognition apparatus 10 can be an emission control program selected from a plurality of emission control programs preregistered in the emission-control-program storage unit 13. Alternatively, an emission control program is prepared corresponding to an installation site or intended use by using an information processing terminal connected via an emission-control-program setting unit or the communication I/F unit 19 and stored in the emission-control-program storage unit 13, and is also stored in the set emission-control-program memory unit 14, so that the emission control program is executed by the emission controller 15.

For example, when the configuration includes a function of preparing the emission control program, the operation unit 18 also has a function of preparing the emission control program for executing illumination control corresponding to the installation site (country) of the paper-sheet recognition apparatus 10, denomination, or items to be recognized by an administrator or installation personnel. In this case, the emission control program is prepared based on a preparation screen of the emission control program displayed on the display unit 17, and the prepared emission control program is stored in the emission-control-program storage unit.

In the above explanations, the first and second line sensors 110 and 120 are arranged on the opposite sides of the banknote path; however, the line sensor can be arranged on either one side. In the above explanations, the transmissive light source 121 is provided on the second line sensor 120 side. However, the transmissive light source 121 may not be provided, or may be provided in the first line sensor 110 to be positioned on an optical axis of the lens 123 of the second line sensor 120.

Further, in the above explanations, a case that a light source for the visible light beams and a light source for the infrared light are provided in the first and second line sensors 110 and 120 has been explained as an example. However, the configuration can be such that a light source for the visible light beams and a light source for the ultraviolet light are provided, or a light source for the visible light beams, a light source for the infrared light, and a light source for the ultraviolet light are provided.

Further, it may be configured so that a light source for the visible light beams capable of emitting light of an arbitrary wavelength and a light source for the infrared light and/or a light source for the ultraviolet light are arranged as the light sources of the line sensor, and an emission control program is used, which is created such that light is emitted from the light source for the visible light beams by switching visible lights of a plurality of wavelengths, and light is also emitted from the light source for the infrared light and/or the light source for the ultraviolet light. In this case, the emission controller 15 performs selecting the light to be output from the light source for the visible light beams from a plurality of lights of wavelengths, as well as switching between the light source for the visible light beams and the light source for the infrared light and/or the light source for the ultraviolet light, based on the emission program.

According to the first embodiment, the reflection image and transmission image of the banknote are read based on the emission control program written such that numbers of light emissions per one emission cycle of the reflective light sources 111 and 122 and the transmissive light source 121 in the banknote recognition sensor 11 differ depending on which item is emphasized in paper-sheet recognition. Therefore, a high-resolution image can be acquired for the emphasized item, thereby enabling to recognize the paper sheet more precisely. Further, because the emission control program can be changed according to an intended use, paper sheet processing having excellent flexibility can be performed.

Second Embodiment

Figure 8A:
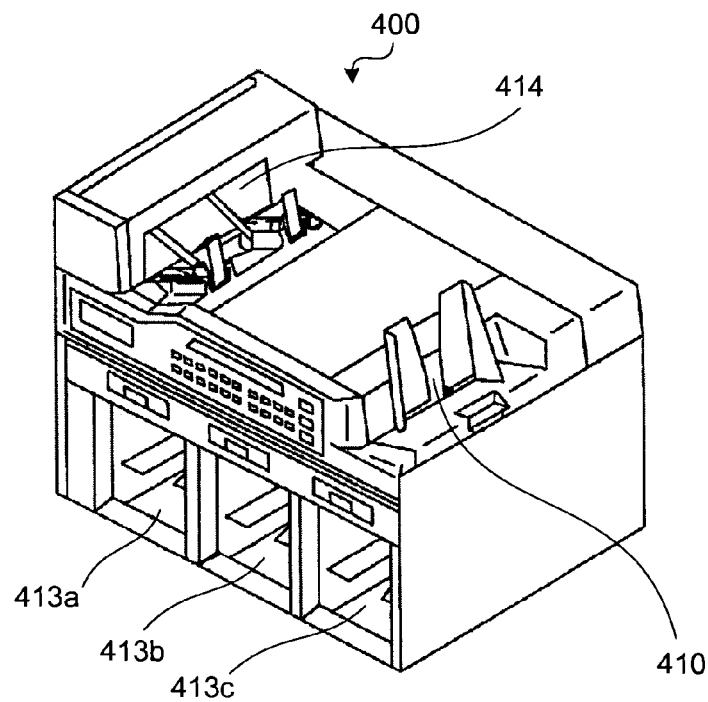
FIG. 8A is a perspective view of a schematic configuration of a paper-sheet processing apparatus according to a second embodiment.
Figure 8B:
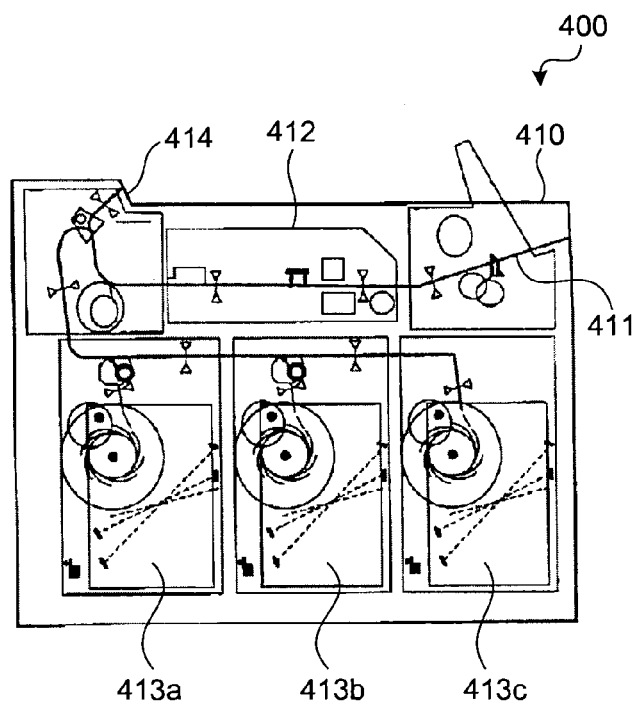
FIG. 8B is a sectional view of the paper-sheet processing apparatus in FIG. 8A.

In a second embodiment of the present invention, a paper-sheet processing apparatus including the paper-sheet recognition apparatus described in the first embodiment as a paper-sheet recognition unit is explained. FIGS. 8A and 8B are examples of the paper-sheet processing apparatus according to the second embodiment, where FIG. 8A is a perspective view of a schematic configuration of the paper-sheet processing apparatus, and FIG. 8B is a sectional view of the paper-sheet processing apparatus in FIG. 8A. The paper-sheet processing apparatus performs deposit and return of banknotes, and is installed in banking facilities such as banks and post offices and other various places.

As shown in FIGS. 8A and 8B, a paper-sheet processing apparatus 400 includes a banknote receiving unit 410 that receives banknotes placed by a user, a transport path 411 that transports the banknotes placed in the banknote receiving unit 410, a paper-sheet recognition unit 412 including a paper-sheet recognition apparatus that performs recognition processing such as denomination judgment and serial number judgment of the banknote explained in the first embodiment, stacking units 413a to 413c that stack the banknotes recognized by the paper-sheet recognition unit 412, for example, by denomination, and a returning unit 414 that returns a banknote of the received banknotes, which has been recognized as unrecognizable or as a counterfeit note.

The banknotes received in the banknote receiving unit 410 are fed one by one to the transport path 411 and transported, and pass through the paper-sheet recognition unit 412. The paper-sheet recognition unit 412 has the same function as that of the paper-sheet recognition apparatus 10 explained in the first embodiment. That is, illumination of a plurality of luminous bodies are irregularly controlled according to an intended use, to acquire information corresponding to kinds of the luminous bodies, and recognition processing such as denomination judgment and serial number judgment is executed based on the information. A case that the banknotes are sorted into three kinds of denominations is explained below as an example.

The banknote having subjected to the recognition processing such as denomination judgment and serial number judgment in the paper-sheet recognition unit 412 is transported to the stacking units 413a to 413c through the transport path 411, based on a recognition result and stored therein. For example, banknotes of denomination A are stored in the stacking unit 413a, banknotes of denomination B are transported to the stacking unit 413b, and banknotes of denomination C are transported to the stacking unit 413c. Further, the banknote not stored in the stacking unit 413 and to be returned according to a result of recognition processing in the paper-sheet recognition unit 412 is transported to the returning unit 414 through the transport path 411.

Third Embodiment

Figure 9A:
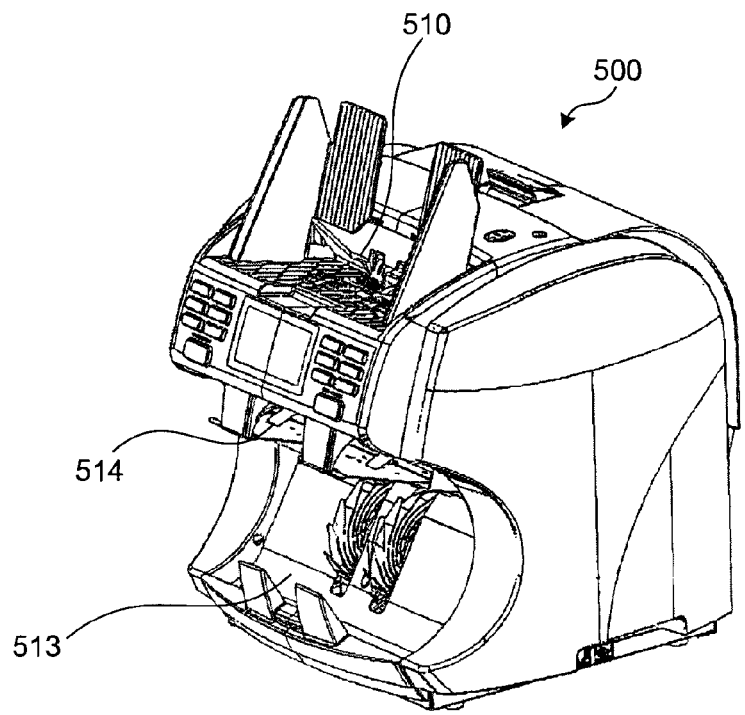
FIG. 9A is a perspective view of a schematic configuration of a paper-sheet processing apparatus according to a third embodiment.
Figure 9B:
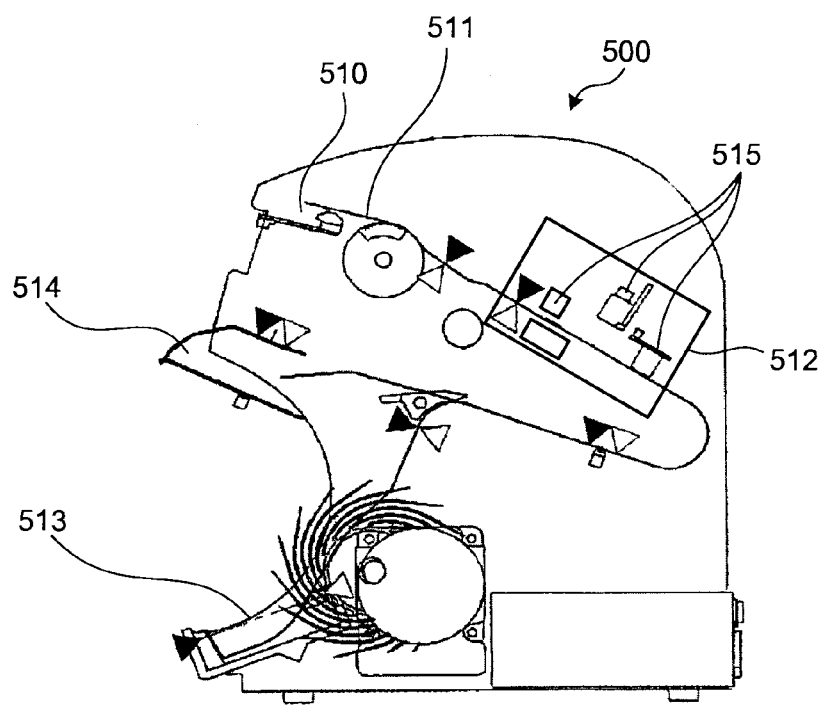
FIG. 9B is a sectional view of the paper-sheet processing apparatus in FIG. 9A.

In a third embodiment of the present invention, a paper-sheet processing apparatus including the paper-sheet recognition apparatus described in the first embodiment as a paper-sheet recognition unit is explained. FIGS. 9A and 9B are examples of the paper-sheet processing apparatus according to the third embodiment, where FIG. 9A is a perspective view of a schematic configuration of the paper-sheet processing apparatus, and FIG. 9B is a sectional view of the paper-sheet processing apparatus in FIG. 9A. The paper-sheet processing apparatus performs counting and recognition of banknotes.

As shown in FIGS. 9A and 9B, a paper-sheet processing apparatus 500 includes a banknote receiving unit 510 that receives banknotes placed by a user, a transport path 511 that transports the banknotes placed in the banknote receiving unit 510, a paper-sheet recognition unit 512 including a paper-sheet recognition apparatus that performs recognition processing such as denomination judgment and serial number judgment of the banknote explained in the first embodiment, a stacking unit 513 that stacks the banknotes recognized by the paper-sheet recognition unit 512, and a returning unit 514 that separates and accumulates a banknote of the received banknotes, which is recognized as unrecognizable or as a counterfeit note. Further, the paper-sheet recognition unit 512 includes, as explained in the first embodiment, banknote recognition sensors 515 such as a line sensor and an ultraviolet sensor that reads optical information of the banknote, and a magnetic sensor that reads magnetic information of the banknote.

The banknotes received in the banknote receiving unit 510 are fed one by one to the transport path 511 and transported, and pass through the paper-sheet recognition unit 512. The paper-sheet recognition unit 512 has the same function as that of the paper-sheet recognition apparatus 10 explained in the first embodiment. That is, illumination of a plurality of luminous bodies are irregularly controlled according to an intended use, to acquire information corresponding to kinds of the luminous bodies, and recognition processing such as denomination judgment and serial number judgment is executed based on the information.

The paper-sheet recognition unit 512 performs recognition such as denomination judgment, authenticity judgment, and fitness judgment based on banknote read information of the banknote detected by a plurality of the banknote recognition sensors 515. For example, the paper-sheet recognition unit 512 can sort the banknotes to genuine notes and counterfeit notes.

The banknote having subjected to authenticity recognition processing in the paper-sheet recognition unit 512 is transported to the stacking unit 513 or the returning unit 514 through the transport path 511, based on the recognition result. Specifically, a banknote judged as a genuine note is transported to the stacking unit 513 through the transport path 511. Further, a banknote judged as a counterfeit note is transported to the returning unit 514 as a rejected note through the transport path 511. This is only one example, and fitness judgment can be performed and a banknote judged as an unfit note can be transported to the returning unit 514 as the rejected note.

The paper-sheet processing apparatus shown in FIGS. 9A and 9B has one banknote receiving unit 510 and two stacking units (the stacking unit 513 and the returning unit 514). However, the paper-sheet recognition apparatus according to the first embodiment can be applied not only to such a paper-sheet processing apparatus but also to other paper-sheet processing apparatuses. A case that the paper-sheet recognition apparatus according to the first embodiment is applied to a paper-sheet processing apparatus having one banknote receiving unit and one stacking unit is explained below.

Figure 10A:
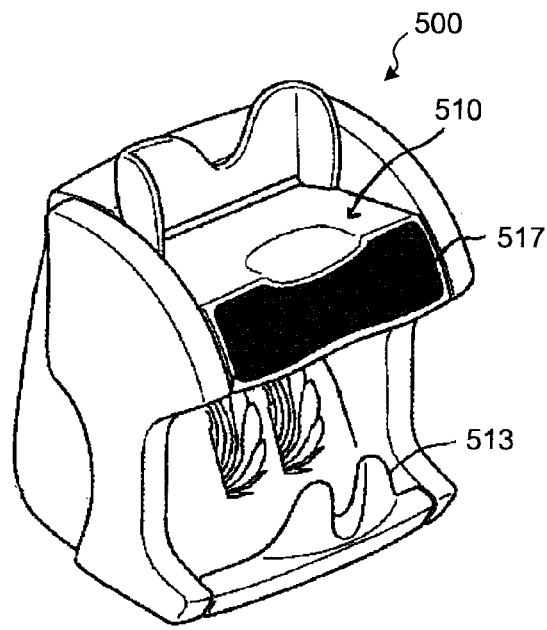
FIG. 10A is a perspective view of another example of the paper-sheet processing apparatus according to the third embodiment.
Figure 10B:
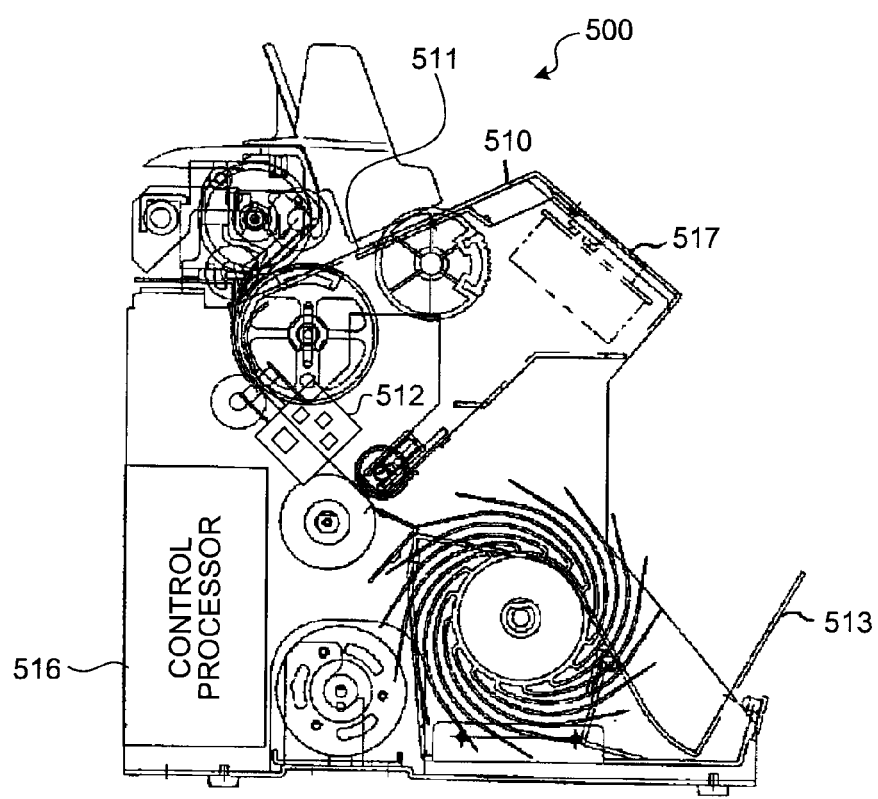
FIG. 10B is a sectional view of the paper-sheet processing apparatus in FIG. 10A.

FIGS. 10A and 10B are another example of the paper-sheet processing apparatus according to the third embodiment, where FIG. 10A is a perspective view of a schematic configuration of the paper-sheet processing apparatus, and FIG. 10B is a sectional view of the paper-sheet processing apparatus in FIG. 10A. The paper-sheet processing apparatus 500 does not include the returning unit 514 in the paper-sheet processing apparatus 500 shown in FIGS. 9A and 9B, but includes a control processor 516 that performs denomination recognition and counts the number of banknotes having passed through the paper-sheet recognition unit 512, and a display unit 517 that displays a processing result acquired by the control processor 516. Like constituent elements in FIGS. 9A and 9B are denoted by identical reference numerals, and explanations thereof will be omitted.

The banknotes received in the banknote receiving unit 510 are fed one by one to the transport path 511 and transported, and pass through the paper-sheet recognition unit 512. The paper-sheet recognition unit 512 has the same function as that of the paper-sheet recognition apparatus 10 explained in the first embodiment. That is, illumination of a plurality of luminous bodies are irregularly controlled according to an intended use, to acquire information corresponding to the luminous bodies, and recognition processing such as denomination judgment and serial number judgment is executed based on the information. A case of performing denomination judgment of the banknote is explained below as an example.

The paper-sheet recognition unit 512 performs denomination judgment of the banknote based on the banknote read information of the banknote detected by a plurality of banknote recognition sensors. When having judged the denomination, the paper-sheet recognition unit 512 transmits a judgment result to the control processor 516. The control processor 516 counts the number of banknotes having passed through the paper-sheet recognition unit 512 for each denomination. The banknote having subjected to denomination judgment in the paper-sheet recognition unit 512 is transported to the stacking unit 513 through the transport path 511.

When the denomination judgment is executed with respect to all the banknotes placed in the banknote receiving unit 510, the control processor 516 calculates a total amount of the placed banknotes by using the number of banknotes stored for each denomination, and displays a calculation result on the display unit 517. The control processor 516 can display a counting result on the display unit 517 in an arbitrary format such as the total amount or the number of banknotes for each denomination.

Fourth Embodiment

Figure 11A:
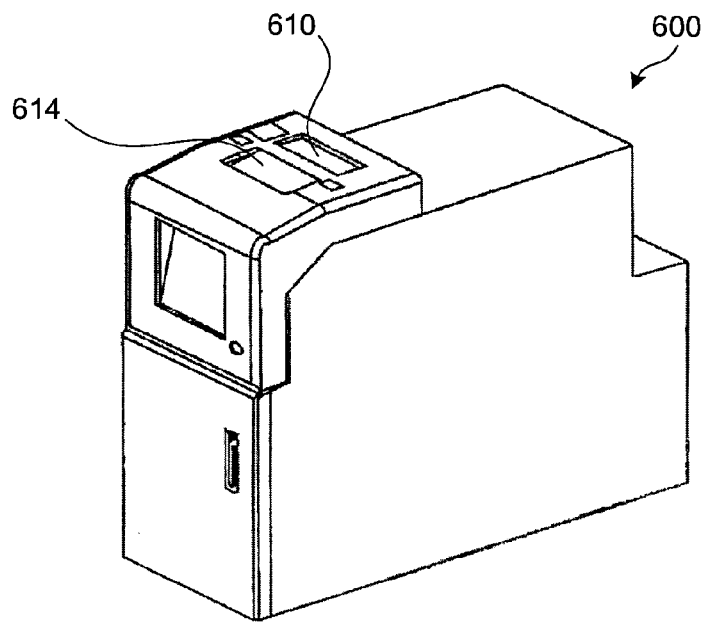
FIG. 11A is a perspective view of a schematic configuration of a paper-sheet processing apparatus according to a fourth embodiment.
Figure 11B:
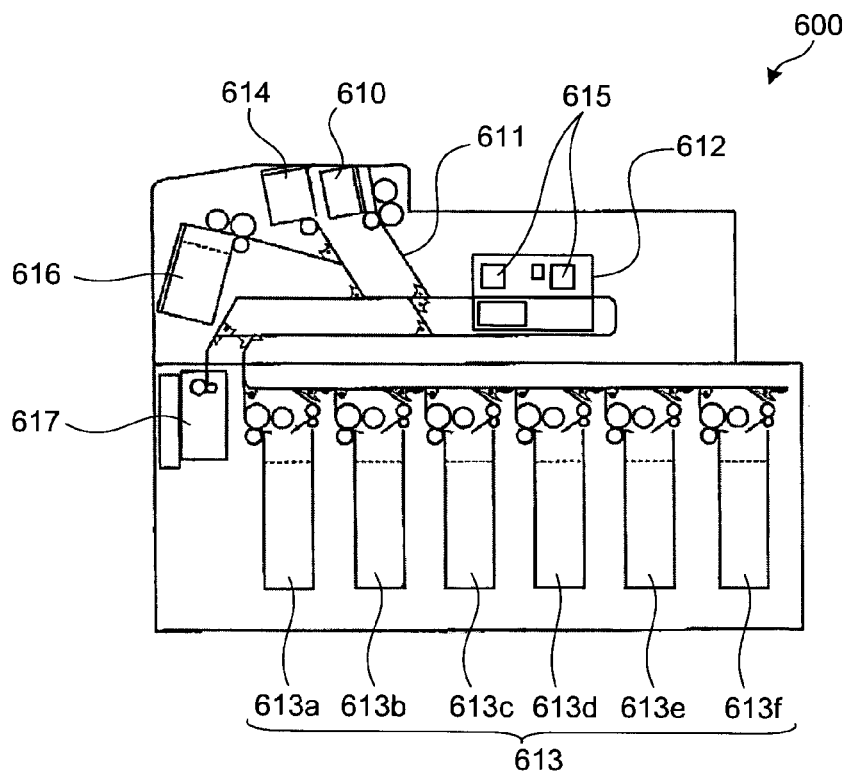
FIG. 11B is a sectional view of the paper-sheet processing apparatus in FIG. 11A.

In a fourth embodiment of the present invention, a paper-sheet processing apparatus including the paper-sheet recognition apparatus described in the first embodiment as a paper-sheet recognition unit is explained. FIGS. 11A and 11B are examples of the paper-sheet processing apparatus according to the fourth embodiment, where FIG. 11A is a perspective view of a schematic configuration of the paper-sheet processing apparatus, and FIG. 11B is a sectional view of the paper-sheet processing apparatus in FIG. 11A. The paper-sheet processing apparatus performs deposit and dispense of banknotes, and is mainly installed in banking facilities such as banks and post offices.

As shown in FIGS. 11A and 11B, a paper-sheet processing apparatus 600 is a circulating-type banknote teller machine, and includes an inlet 610 that receives a banknote input by a user, a transport path 611 that transports a banknote placed in the inlet 610, a paper-sheet recognition unit 612 including a paper-sheet recognition apparatus that performs recognition processing such as denomination judgment and serial number judgment of the banknote explained in the first embodiment, by-denomination storing-and-dispensing units 613a to 613f that stack and store banknotes recognized by the paper-sheet recognition unit 612 by denomination, an outlet 614 that dispense banknotes corresponding to an amount requested by a user, transported from the by-denomination storing-and-dispensing units 613a to 613f, an escrow unit 616 that temporarily stores banknotes judged as genuine notes by the paper-sheet recognition unit 612, of the banknotes placed in the inlet 61, and a reject box 617 that stores unrecognizable notes and banknotes judged as counterfeit notes, of the banknotes dispensed from the by-denomination storing-and-dispensing units 613a to 613f. Further, the paper-sheet recognition unit 612 includes, as explained in the first embodiment, banknote recognition sensors 615 such as a line sensor and an ultraviolet sensor that read optical information of the banknote, and a magnetic sensor that reads magnetic information of the banknote.

An outline of deposit processing of banknotes in the paper-sheet processing apparatus 600 is explained. The banknotes received in the inlet 610 are fed one by one to the transport path 611 and transported, and pass through the paper-sheet recognition unit 612. The paper-sheet recognition unit 612 has the same function as that of the paper-sheet recognition apparatus 10 explained in the first embodiment. That is, illumination of a plurality of luminous bodies are irregularly controlled according to an intended use, to acquire information of the banknotes corresponding to the luminous bodies, and recognition processing such as denomination judgment, serial number judgment, authenticity judgment, and fitness judgment is executed based on the information.

The deposited banknote recognized as the genuine note by the paper-sheet recognition unit 612 is fed to the escrow unit 616 through the transport path 611, and temporarily stored therein. On the other hand, the deposited banknote recognized as a counterfeit note or unrecognizable is transported to the outlet 614 through the transport path 611, and returned to a user.

When escrow processing of all the deposited banknotes placed in the inlet 610 to the escrow unit 616 or transport processing thereof to the outlet 614 is complete and then, if there is an instruction to acknowledge the deposit, storage of the banknotes temporarily stored in the escrow unit 616 in the by-denomination storing-and-dispensing units 613a to 613f is started. The banknotes stored in the escrow unit 616 are fed one by one to the transport path 611 and transported, and pass through the paper-sheet recognition unit 612. The paper-sheet recognition unit 612 performs denomination recognition. Accordingly, the recognized banknote is transported to the by-denomination storing-and-dispensing units 613a to 613f based on a denomination recognition result, and stored therein. The banknotes in the escrow unit 616 can be automatically stored in by-denomination storing-and-dispensing units 613 by denomination.

An outline of dispensing processing of banknotes in the paper-sheet processing apparatus 600 is explained next. Upon reception of a dispensing request from a user, banknotes of a requested denomination are fed one by one from a corresponding unit of the by-denomination storing-and-dispensing units 613a to 613f to the transport path 611 and transported, and pass through the paper-sheet recognition unit 612. The paper-sheet recognition unit 612 performs denomination judgment of the banknote based on the banknote read information of the banknote detected by the banknote recognition sensors 615.

The recognized banknotes are transported to the outlet 614 through the transport path 611. The banknote judged as unrecognizable by the paper-sheet recognition unit 612 is fed to the reject box 617 through the transport path 611 and stored therein. When dispensed banknotes corresponding to an amount to be dispensed are stacked in the outlet 614, the user can take the dispensed banknotes, thereby finishing the dispensing processing.

Fifth Embodiment

Figure 12:
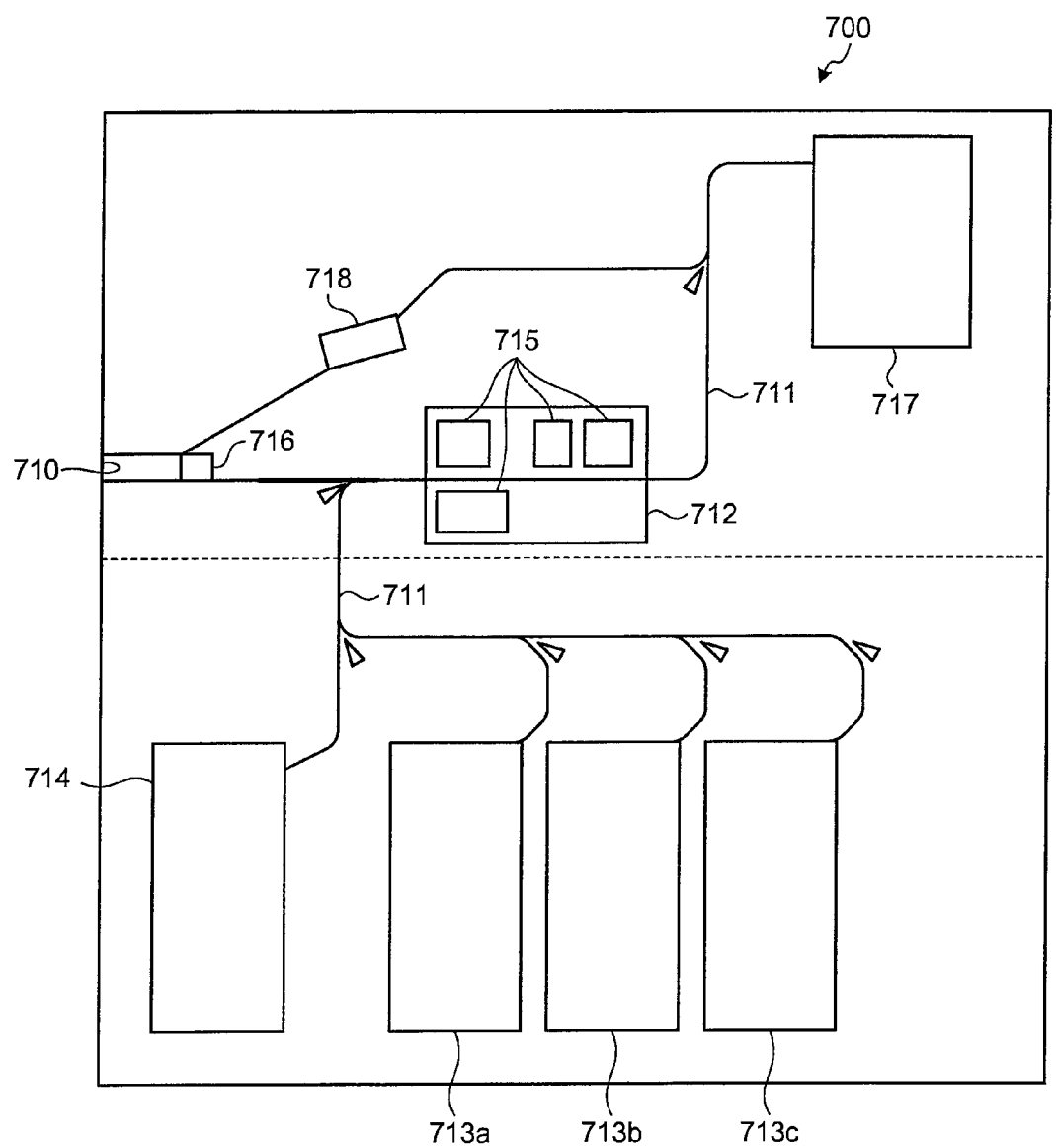
FIG. 12 is a sectional view of a schematic configuration of a paper-sheet processing apparatus according to a fifth embodiment.

In a fifth embodiment of the present invention, paper-sheet processing apparatus including the paper-sheet recognition apparatus described in the first embodiment as a paper-sheet recognition unit is explained. FIG. 12 is a sectional view of a schematic configuration of the paper-sheet processing apparatus according to the fifth embodiment. The paper-sheet processing apparatus performs deposit and dispense of banknotes, and is mainly installed in banking facilities such as banks and post offices.

As shown in FIG. 12, a paper-sheet processing apparatus 700 includes a handling port 710 for deposit and dispense of banknotes performed between a user and the apparatus, a transport path 711 that transports the banknote between the handling port 710 and respective processing units, a paper-sheet recognition unit 712 including a paper-sheet recognition apparatus that performs recognition processing such as denomination judgment and serial number judgment of the banknote explained in the first embodiment, by-denomination storing-and-dispensing units 713a to 713c that stack and store banknotes recognized by the paper-sheet recognition unit 712 by denomination, a reject box 714 that stores a banknote, which cannot be used as a dispensed banknote, such as an, authenticity-unclear banknote or soiled banknote recognized by the paper-sheet recognition unit 712, a feeding unit 716 that feeds the banknotes deposited through the handling port 710 one by one to the transport path 711, an escrow unit 717 that temporarily stores the banknote judged as the genuine note by the paper-sheet recognition unit 712, of the banknotes deposited through the handling port 710, and a temporary stacking unit 718 that temporarily stacks banknotes prior to dispensing, which have been taken out from the by-denomination storing-and-dispensing units 713a to 713c and to be dispensed from the handling port 710. Further, the paper-sheet recognition unit 712 includes, as explained in the first embodiment, banknote recognition sensors 715 such as a line sensor and an ultraviolet sensor that read optical information of the banknote, and a magnetic sensor that reads magnetic information of the banknote.

An outline of the deposit processing of banknotes in the paper-sheet processing apparatus 700 is explained. The banknotes received in the handling port 710 are fed one by one to the transport path 711 by the feeding unit 716 and pass through the paper-sheet recognition unit 712. The paper-sheet recognition unit 712 has the same function as that of the paper-sheet recognition apparatus 10 explained in the first embodiment. That is, illumination of a plurality of luminous bodies are irregularly controlled according to an intended use, to acquire information of the banknotes corresponding to the kind of the luminous bodies, and processing such as denomination judgment, serial number judgment, authenticity judgment, and fitness judgment is executed based on the information.

The deposited banknotes recognized as the genuine note by the paper-sheet recognition unit 712 are fed to the escrow unit 717 through the transport path 711 and temporarily stored therein. On the other hand, the input banknote recognized as a counterfeit or unrecognizable note by the paper-sheet recognition unit 712 is transported to the temporary stacking unit 718 through the transport path 711. After the recognition processing of all the deposited banknotes is complete, the unrecognizable-banknotes stacked in the temporary stacking unit 718 are transported to the handling port 710 and returned to the user.

When the escrow processing of all the deposited banknotes placed in the handling port 710 to the escrow unit 717 or transport processing thereof to the handling port 710 is complete and there is a deposit instruction, the storage processing of the banknotes temporarily stored in the escrow unit 717 in the by-denomination storing-and-dispensing units 713a to 713c is started. The banknotes stored in the escrow unit 717 are fed one by one to the transport path 711 and transported, and pass through the paper-sheet recognition unit 712. The paper-sheet recognition unit 712 performs denomination recognition. Accordingly, the recognized banknote is transported to the by-denomination storing-and-dispensing units 713a to 713c based on a denomination recognition result, and stored therein.

An outline of the dispensing processing of banknotes in the paper-sheet processing apparatus 700 is explained next. Upon reception of a dispensing request from the user, banknotes of a requested denomination are fed one by one from a corresponding unit of the by-denomination storing-and-dispensing units 713a to 713c to the transport path 711 and transported, and pass through the paper-sheet recognition unit 712. The paper-sheet recognition unit 712 performs denomination judgment of the banknote based on the banknote read information of the banknote detected by the banknote recognition sensors 715.

The recognized banknotes are transported to the temporary stacking unit 718 through the transport path 711. The banknote judged as a counterfeit note or unrecognizable by the paper-sheet recognition unit 712 is fed to the reject box 714 through the transport path 711 and stored therein. When dispensed banknotes corresponding to an amount to be dispensed are stacked in the temporary stacking unit 718, the user can take out the dispensed banknotes, thereby finishing the dispensing processing.

INDUSTRIAL APPLICABILITY

As described above, the paper-sheet recognition apparatus according to the present invention is useful when an image corresponding to a purpose is acquired from a paper sheet to recognized the paper sheet.

The invention claimed is:

1. A paper-sheet recognition apparatus that acquires information from a paper sheet and recognizes the paper sheet based on the information, the paper-sheet recognition apparatus comprising:
one or more light emitting units, each of which includes a plurality of light sources and outputs n lights (n is an integer equal to or larger than 2) of different wavelengths therefrom;
an emission-control program storage unit that stores a plurality of emission-control programs that have been created beforehand in order to obtain paper sheet images of different resolutions for respective lights concurrently, each resolution associated with information required for a purpose of a recognition of the paper sheet;
an operation unit through which one of the plurality of emission-control programs is selected,
an emission controller that performs emission control of the plurality of light sources of the light emitting units by executing the emission-control program selected through the operation unit;
a line sensor that receives a light, which has been emitted from the light sources and then reflected from and/or transmitted through the paper sheet while the paper sheet is being transported; and
a paper-sheet recognition processor that recognizes the paper sheet by using an optical signal received by the line sensor, wherein
each of the emission-control programs includes instructions for the emission of the light sources, such that, in one emission cycle, a number of light emissions of at least one of the n lights differs from a number of light emissions of at least one of the other lights, and the one emission cycle is a cycle of illumination control of the plurality of light sources; and
a resolution of a paper sheet image for each light is determined according to which of the plurality of emission-control programs is selected.

2. The paper-sheet recognition apparatus according to claim 1, wherein the light sources are light-emitting diodes in arrays.

3. The paper-sheet recognition apparatus according to claim 1, wherein each of the light emitting units comprises one or more kinds of light sources each outputting a visible light beam of a predetermined wavelength, and one or more kinds of light sources each outputting an invisible light beam of a predetermined wavelength.

4. The paper-sheet recognition apparatus according to claim 1, wherein each of the light emitting units comprises:
at least one first light source for emitting a light in a predetermined wavelength range that can output arbitrary wavelength light by changing among lights of a plurality of wavelengths in the predetermined wavelength range; and at least one second light source for emitting a light of a predetermined wavelength that outputs only predetermined wavelength light outside the predetermined wavelength range, and wherein when a first emission-control program is selected, the emission controller performs emission control including selecting light to be output from among the lights of the plurality of wavelengths, and switching an output at least between the first light source and the second light source, such that the numbers of light emissions per one emission cycle with respect to the lights of the plurality of wavelengths that can be output by the first light sources and the light of the wavelength output by the second light sources differ.

5. The paper-sheet recognition apparatus according to claim 4, wherein when the first emission-control program is selected, the first light sources output an arbitrary visible light beam by changing among visible light beams of a plurality of wavelengths, and the second light sources output an invisible light beam of a predetermined wavelength.

6. The paper-sheet recognition apparatus according to claim 1, wherein the first one of n lights is a visible light beam of a predetermined wavelength, the line sensor is arranged at a position for receiving a reflected light of the first one of n lights, which has been emitted from a light emitting unit and then reflected from the paper sheet while the paper sheet is being transported, and when a second emission-control program is selected, the emission controller performs emission control of the plurality of light sources of the light emitting units such that the number of light emissions per one emission cycle with respect to the first one of n lights is larger than those of other lights.

7. The paper-sheet recognition apparatus according to claim 1, wherein n is an integer equal to or larger than 3, the first one of n lights is a visible light beam of a predetermined wavelength capable of reading a serial number of the paper sheet, the second one of n lights is a visible light beam of a wavelength different from the wavelength of the first one of n lights, capable of reading information printed on the paper sheet other than the serial number, the line sensor is arranged at a position for receiving reflected lights of the first and second ones of n lights, which have been emitted from the light sources of the light emitting units and then reflected from the paper sheet while the paper sheet is being transported, and when a third emission-control program is selected, the emission controller performs emission control of the light emitting units such that numbers of light emissions per one emission cycle with respect to the first and second ones of n lights are larger than those of other lights.

8. The paper-sheet recognition apparatus according to claim 1, wherein the first one of n lights is an invisible light beam, and the emission controller performs emission control of the plurality of light sources of the light emitting units such that the number of light emissions per one emission cycle with respect to the first one of n lights is larger than those of other lights.

9. The paper-sheet recognition apparatus according to claim 1, wherein n is an integer equal to or larger than 3, the first and second ones of n lights are invisible light beams, and the emission controller performs emission control of the plurality of light sources of the light emitting units such that the numbers of light emissions per one emission cycle with respect to the first and second ones of n lights are larger than those of other lights.

10. The paper-sheet recognition apparatus according to claim 1, wherein the first one of n lights is a visible light beam of a predetermined wavelength, the line sensor is arranged at a position for receiving a transmitted light of the first one of n lights, which has been emitted from the plurality of light sources of the light emitting units and then transmitted through the paper sheet while the paper sheet is being transported, and the emission controller performs emission control of the plurality of light sources of the light emitting units such that the number of light emissions per one emission cycle with respect to the first one of n lights is larger than those of other lights.

11. A paper-sheet recognition apparatus that acquires information from a paper sheet and recognizes the paper sheet based on the information, the paper-sheet recognition apparatus comprising:

one or more light emitting units, each of which includes a plurality of light sources and outputs n lights (n is an integer equal to or larger than 2) of different wavelengths therefrom;

an emission controller that performs emission control of the light emitting units;

a line sensor that receives a light, which has been emitted from a light emitting unit and then reflected from and/or transmitted through the paper sheet while the paper sheet is being transported;

a paper-sheet recognition processor that recognizes the paper sheet by using an optical signal received by the line sensor;

an emission-control-program storage unit that stores therein a plurality of emission-control programs for performing emission control of the light sources such that, in one emission cycle, a number of light emissions of at least one of the n lights differs from a number of light emissions of at least one of the other lights depending on the information desired to be used in recognizing the paper sheet, the emission-control programs have been created beforehand in order to obtain paper sheet images of different resolutions concurrently, each resolution associated with information required for a purpose of a recognition of the paper sheet;

an operation unit through which one of the plurality of emission-control programs is selected, wherein the emission controller performs the emission control of the light sources based on an emission-control program selected from the plurality of emission-control programs in the emission-control-program storage unit through the operation unit, and a resolution of a paper sheet image for each light is determined according to which of the plurality of emission-control programs is selected.

12. A paper-sheet processing apparatus comprising:
a receiving unit that receives paper sheets;
a transporting unit that transports paper sheets received by the receiving unit one by one;
a paper-sheet recognition portion comprising the paper-sheet recognition apparatus according to claim 1, which recognizes a paper sheet received by the receiving unit based on a predetermined criterion; and
a paper-sheet sorting unit that sorts paper sheets based on a recognition result acquired by the paper-sheet recognition portion.

13. A paper-sheet processing apparatus comprising:
a receiving unit that receives paper sheets;
a transporting unit that transports paper sheets received by the receiving unit one by one;
a paper-sheet recognition portion comprising the paper-sheet recognition apparatus according to claim 1, which recognizes a paper sheet received by the receiving unit based on a predetermined criterion; and
a paper-sheet counting unit that counts paper sheets based on a recognition result acquired by the paper-sheet recognition portion.

14. A paper-sheet recognition method of acquiring information from a paper sheet and recognizing the paper sheet based on the information, the paper-sheet recognition method comprising:
an emission-control program storage step of storing a plurality of emission-control programs that have been created beforehand in order to obtain paper sheet images of different resolutions concurrently, each resolution associated with information required for a purpose of a recognition of the paper sheet in an emission-control program storage unit;
an emission-control program selection step of selecting an emission-control program stored in the emission-control program storage unit to determine a resolution of a paper sheet image;
a light emitting step of causing one or more light emitting units, each of which includes a plurality of light sources and outputs n lights (n is an integer equal to or larger than 2) of different wavelengths, to emit the lights by performing emission control of the plurality of light sources of the light emitting units by executing the selected emission-control program such that, in one emission cycle, a number of light emissions of at least one of the n lights differs from a number of light emissions of at least one of the other lights;
a light receiving step of receiving a light by a line sensor, which has been emitted from a light source and then reflected from and/or transmitted through the paper sheet while the paper sheet is being transported; and
a paper-sheet-judgment processing step of recognizing the paper sheet by using an optical signal received at the light receiving step.

15. The paper-sheet recognition method according to claim 14, wherein
the light emitting units comprise n light sources respectively corresponding to the n lights of the different wavelengths to be output, and
when a first emission-control program is selected, at the light emitting step, emission control of the n light sources is performed such that the number of light emissions per one emission cycle with respect to each of the lights output from the n light sources differs.

16. The paper-sheet recognition method according to claim 14, wherein when a second emission-control program is selected, each of the light emitting units comprises at least one light source that outputs visible light beams of a predetermined wavelength and at least one light source that outputs invisible light beams of a predetermined wavelength.

17. The paper-sheet recognition method according to claim 14, wherein
each of the light emitting units comprises:
at least one first light source for emitting a light in a predetermined wavelength range that can output arbitrary wavelength light by changing among lights of a plurality of wavelengths in the predetermined wavelength range; and
at least one second light source for emitting a light of a predetermined wavelength that outputs only predetermined wavelength light outside the predetermined wavelength range, and wherein
when a third emission-control program is selected, at the light emitting step, emission control including selecting light to be output from among the lights of the plurality of wavelengths, and switching an output at least between the first light source and the second light source, is performed such that the numbers of light emissions per one emission cycle with respect to the lights of the plurality of wavelengths that can be output by the first light sources and the light of the wavelength output by the second light sources differ.

18. The paper-sheet recognition method according to claim 17, wherein
the first light source outputs a visible light beam of an arbitrary wavelength by changing among visible light beams of a plurality of wavelengths, and the second light source outputs an invisible light beam of a predetermined wavelength.

* * * * *